(12) United States Patent
Aoki

(10) Patent No.: US 6,407,823 B1
(45) Date of Patent: Jun. 18, 2002

(54) NETWORK SYSTEM, INFORMATION PROCESSING DEVICE AND INFORMATION MEMORY MEDIUM

(75) Inventor: Mikio Aoki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/200,414

(22) Filed: Nov. 27, 1998

(30) Foreign Application Priority Data

Dec. 12, 1997 (JP) .............................................. 9-343219

(51) Int. Cl.[7] .............................................. G06K 15/02
(52) U.S. Cl. ..................... 358/1.15; 358/1.12; 358/434; 358/435; 358/438
(58) Field of Search ........................ 358/1.1, 1.5, 1.12, 358/1.13, 1.14, 1.15, 405, 407, 438, 468, 434, 435, 439; 379/100.01, 100.06

(56) References Cited

U.S. PATENT DOCUMENTS 5,832,191 A * 11/1998 Thorne ...................... 358/1.15

FOREIGN PATENT DOCUMENTS

JP 8339276 12/1996

* cited by examiner

*Primary Examiner*—Mark Wallerson
(74) *Attorney, Agent, or Firm*—Oliff & Berridge, PLC

(57) ABSTRACT

A network system which comprises a client printer 40*a* and a server device which has high processing ability, which are connected via a communication line is presented. The client printer requests data processing of printing data, which it will print itself, from the server device on the network. The server device receives the necessary data processing program from the client printer or another device on the network when it does not itself have the necessary data processing program, and performs the data processing. The client printer receives the processed printing data performs a print output.

28 Claims, 19 Drawing Sheets

NETWORK SYSTEM, INFORMATION PROCESSING DEVICE AND INFORMATION MEMORY MEDIUM

BACKGROUND OF THE INVENTION

1. Field of Invention

The present invention relates to an information processing device which performs data processing with respect to data which is printed by another printer, a network system which includes the information processing device, and an information memory medium to control the information processing device.

2. Description of Related Art

There are many cases where a printer may have a low processing ability. Because of this, the printer driver of the computer may perform processing, such as image processing or the like, to create printing data which is printable by the printer, and cause the printer to print the data.

However, since it is necessary to execute a program with a large amount of additional processing (as in the image processing) with a computer which has a low processing ability, there are problems such that image processing takes a long time and printing is often delayed.

Moreover, the speed at which the computer transmits the printing data to the printer is influenced by the printing speed of the printer. In other words, the computer cannot go on to the next operation until all the printing data has been sent to the printer. Therefore, the performance of the printing operation may be significantly deteriorated.

For example, while a laser printer has memory for printing of one page, an ink jet type printer only has memory for printing one line at a time. Because of this, when printing is performed with an ink jet type printer, there are problems such that the computer is not released from the transmission process for a period of time, the subsequent applications do not function well, and the reaction of the computer may be delayed.

Moreover, the command which the printer normally processes is fixed. Because of this, the computer has to prepare commands that will be recognized by the corresponding printer (e.g., ESC/P, Postscript, or the like, printing control commands, and page command). Accordingly, a computer cannot print on a printer which does not respond to unrecognized commands that the printer driver of a particular computer prepares.

SUMMARY OF THE INVENTION

The present invention provides an information processing device which supports the improvement of the functionality of a printer which has a low processing ability by causing an image processing device with a high processing ability that has a sufficient data processing execution environment to carry out data processing of data that is to be printed by another printer on the network. The purpose is also to provide recording medium in order to control the information processing device, and a network system to realize the effective discrete processings of a printer and the information processing device which are connected to the network.

The network system of the present invention system comprises a client printer that performs a data processing request and a server device that has an environment which can execute data processing that includes image processing that is requested by the client printer and/or processing relating to a printer language. The client printer comprises a data processing ability inquiry unit that inquires about ability information relating to data processing with respect to other devices that are connected to the network. The client processor determines the server device from which to request data processing based on the ability information that is sent from the other network devices, transmits printing data that is to be processed to the server device, and requests that the data be processed and transmitted from the server device. Printing controller controls both the reception of processed data from the server device, and printing. The server device comprises an ability information reply unit that replies with ability information relating to its own data processing in response to the inquiry for ability information from the client printer. A data processing server performs data processing of printing data that is received from the client printer and transmits the processed data back to the client printer in response to a transmission request from the client printer.

Moreover, the information processing device is structured so as to be connectable, by a network, to a plurality of devices that include a printer that performs a data processing request, and having an environment that can execute data processing that includes at least processing relating to image processing that is requested by the printer, and/or processing relating to a printer language. The information processing device comprises an ability information reply unit that replies with ability information relating to its own data processing in response to a request for ability information relating to data processing from the printer, a data processing server that performs data processing of printing data that is received from the printer, and transmits the processed data to the client printer in response to a transmission request from the client printer.

Moreover, the information memory medium of the present invention that is structured so as to be connectable, by a network, to a plurality of devices that include a printer that performs a data processing request, and which stores information to control an information processing device that has an environment that can execute data processing that includes at least image processing and/or processing relating to a printer language that is/are requested from the printer. The information memory medium comprises information for replying with ability information relating to its own data processing in response to the inquiry for ability information from a printer, the information for data processing printing data that is received from the printer, and the processed data to be transmitted to the client printer in response to a transmission request from the client printer.

Here, the ability information concerning data processing comprises the information concerning the existence or nonexistence of an environment which can execute the data processing, and of a program for data processing execution. An environment which can execute the data processing includes a memory capacity which is capable of executing the data processing program, OS environment, and the processing ability of the CPU.

Moreover, the image processing includes converting the RGB of the image data to CMYK, the rendering processing which develops the character and lines into a bitmap, and color converting processing which performs color conversion which corresponds to the specific type of printer.

The ability information relating to the image processing execution environment mainly refers to the environment for executing image processing, and includes the processing ability of the memory capacity that can execute the image processing program, the OS environment, and the processing ability of the CPU.

The processing related to the printer language includes at least a supporting printer language and a printer language conversion program.

According to the present invention, the printer can request data processing, which includes at least one of image processing of printing data to be printed by the printer itself and/or processing related to the printer language, by an information processing device that has the data processing execution environment. Therefore, even with a printer which has low hardware processing ability or a printer which does not have the necessary data processing execution environment, the same usage becomes possible as is possible with a printer which has a high hardware processing ability or a printer which has the data processing execution environment.

Furthermore, according to the present invention, the effective discrete processing of a printer which is connected to the network and the information processing device can be realized.

Moreover, the ability information reply unit of the network system of the present invention comprises a data processing program information inquiry unit that inquires about data processing program information, which includes the existence or nonexistence information concerning a data processing program for performing data processing with respect to other devices that are connected to the network, a virtual program information determining unit that determines virtual program information including information indicating its own executable data processing program based on the data processing program information that is sent from the other devices that are connected to the network in response to the inquiry, and a virtual program information reply unit that replies to the inquiry for ability information concerning data processing from the client printer. Here, it is preferable to set the network system to include at least one other device, and for the other devices to include a data processing program ability information reply unit which responds with the device's own data processing program information in response to an inquiry from the server device.

Moreover, the ability information reply unit of the information processing device of the present invention comprises a data processing program information inquiry unit that inquires about data processing program information, which includes the existence or nonexistence of a data processing program for performing data processing, with respect to other devices that are connected to the network, a virtual program information determining unit that determines virtual program information that includes information concerning its own executable data processing program, based on the data processing program information that is sent from the other devices that are connected to the network in response to the inquiry, and a virtual program information reply unit that replies to the inquiry for ability information concerning data processing from the client printer, based on the virtual program information.

The information concerning a self-executable data processing program that is included in the virtual program information which is determined by the server device includes data processing program information which is in the memory of other devices in the network, even if the data processing program is not found in its own memory.

In other words, in an inquiry for the ability information concerning such data processing from the client printer, the server device responds that the processing is possible when another device on the network has the data processing program that is required, even if the server device itself does not have that data processing program. Accordingly, the client printer can request data processing which requires a data processing program which the server device does not have. According to the present invention, the effective usage of the execution environment of the server device can be obtained. Furthermore, according to the present invention, the effective discrete processing of a printer which is connected to the network and the information processing device, can be realized. Here, it is preferable to have a structure in which the other device stores the data processing program in its own memory, and in which a device is included to transmit the data processing program to the server device.

When the data processing which is requested of the server device by the client printer needs a data processing program which the server device itself does not have, it receives the data processing program from another device that includes the data processing program and performs the data processing. Therefore, it is not necessary to have the necessary data processing program for data processing in the device's own memory. Accordingly, it is possible to obtain the effective usage of the execution environment of the server device. Moreover, the network itself does not need to change the ability of the device itself in terms of hardware, and effective processing time sharing can be obtained.

Moreover, in the present invention, the data processing program information includes the version information of the data processing program, and the data processing program receiving unit, based on the version information, determines another device that has the necessary data processing program, and transmits a request for the data processing program to the other device.

In recent years, there are many cases that the same kind of programs have a plurality of versions, and there are many cases that commands or the like are different for every version. According to the present invention, the data processing which acknowledges the version can be possible.

Moreover, the data processing program receiving unit of the network system and the information processing device of the present invention performs a transmission request with respect to another device that has a data processing program with version information which shows it is the newest when there are a plurality of the same type of data processing programs. According to the present invention, the data processing can be performed by using the newest version of data processing program.

Moreover, in the present invention, the server device or the information processing device prestores the data processing program in its own memory and the data processing server performs the data processing for printing by using the data processing program which is stored in its own memory.

When the server device has the data processing program necessary for data processing, data processing is performed. According to the present invention, the server device can perform data processing in an expeditious manner.

Moreover, when the same type of data processing program is stored in each device, the data processing program receiving unit of the network system and the information processing device of the present invention only perform a transmission request with respect to the other device when the version information of the other device shows that it is newer.

There are cases when the server device itself has the necessary data processing program. According to the present invention, data processing can be performed by using the newest version of the data processing program in this case as well.

Moreover, the information processing device of the present invention further comprises a data processing ability inquiry unit that inquires about ability information relating to data processing with respect to other devices that are connected to the network, a client processor that determines a server device from which to request data processing based on the ability information that is sent from the other devices that are connected to the network, transmits printing data that is to be data processed to the server device and requests data processing, and requests transmission of the processed data from the server device, and a printing controller that controls the reception and printing of processed data received from the server device.

According to the present invention, the information processing device can be operated as the client printer, depending on the necessity. Moreover, the client processor of the network system or the information processing device of the present invention transmits its own device information to the server device, and the data processing server determines the data processing program to perform the processing of printing data based on the device information which is received from the client printer.

The device information specifies the device, and is, for example, a printer ID, or the like. The device information is different for the image processing, rendering processing, color conversion processing, or the like, for every printer device. Accordingly, the server device of which the processing is requested, can specify the data processing program to perform the image processing which is optimum for the client printer.

Moreover, for a normal printer, since the printer commands for every device are determined, the server device of which the processing is requested can specify the data processing program to perform the processing relating to the printer language which is optimum for the client printer according to the device information.

Moreover, the client printer or the information processing device of the network system of the present invention prestores the data processing program in its own memory, and the client processor transmits the data processing program which is stored in its own memory, and the printing data, to the server device and performs a processing request. The data processing server they processes printing data by using the data processing program which is received from the client printer.

Since the server device receives data processing requests from a plurality of printers, when the server device has a data processing program which corresponds to each printer, the server has to have a tremendous amount of data processing programs that correspond to all the devices, and the memory efficiency suffers.

Accordingly, as in the present invention, when the optimum image processing program is present on the client side that requests the processing, the data and the image processing program are given together and if the processing request is performed, memory efficiency improves.

Moreover, the data processing program which is transmitted by the client printer or information processing device to the server device, comprises a data processing program which performs at least image processing.

Rendering processing, color conversion processing, or the like, are different depending on the printer device. Accordingly, when a server of which processing is requested is caused to hold the image data processing program, the server is required to have a tremendous amount of image processing programs that correspond to all the devices, and the memory efficiency suffers.

Accordingly, the memory efficiency is better when the image processing program that is optimum to the client side which requests the processing is stored at the client side, and the processing request is made by giving the data and the image processing program together.

Moreover, in the network system and image processing device of the present invention, the ability information relating to data processing comprises the version information of data processing program. When the server device has the same kind of data processing program as the image processing device, the client processor transmits the data processing program to the server device only when the version information of that data processing program that is stored in the image processing device own memory shows that it is newer.

Normally, since there are many cases that the data processing program stored in a printer is old, it is preferable to confirm the version information and to only send when the data processing program which is stored in the printer is new.

According to the present invention, the server can perform the processing using the newest version of the data processing program without receiving an old data processing program.

The data processing program information inquiry unit of the network system or information processing device of the present invention performs an inquiry for the data processing program information with respect to other devices that are connected to the network, when the devices are first connected to the network, when another new device is connected to the network, or when there is an inquiry from the client printer.

When the printer is connected to the network, virtual printer information can be given quickly to the computer by performing an inquiry. When there is a connection of a new device to the network, the virtual printer information which includes the new device's ability can be given by performing an inquiry. When there is an inquiry for ability information from the computer, the newest virtual printer information can be given constantly by performing an inquiry.

Moreover, in the present invention, the printing data includes the image data, or the image data and a printing command. Image data is data which shows the content which is image displayed on, for example, a display or the like, and includes text data. It also includes the data in which the image processing of conversion from RGB to CMYK, rendering processing, color conversion, or the like, are not performed at all, or data for which some or all of this image processing is performed.

Moreover, in the information processing device of the present invention, the ability information relating to data processing includes the version information of the data processing program, and when the server device has a data processing program that is of the same type as that stored in the memory of the client processor, the client processor transmits the data processing program to the server device only when it is shown that the version information of the data processing program which is stored in its own memory is newer.

DETAILED DESCRIPTION OF PREFERRED EMBODIMENTS

The preferred embodiments of the present invention are explained in detail based on the drawings.

(1) First Embodiment

The characteristics of the present embodiment are to improve the functionality of a printer which has low processing ability by causing an information processing device (hereafter, server device) which has high processing ability and which has the sufficient data processing execution environment to perform data processing with respect to data to be printed by another printer (hereafter, client printer), and to thus realize an effective discrete processing for the client printer and the server device that are connected to the network.

Figure 1:
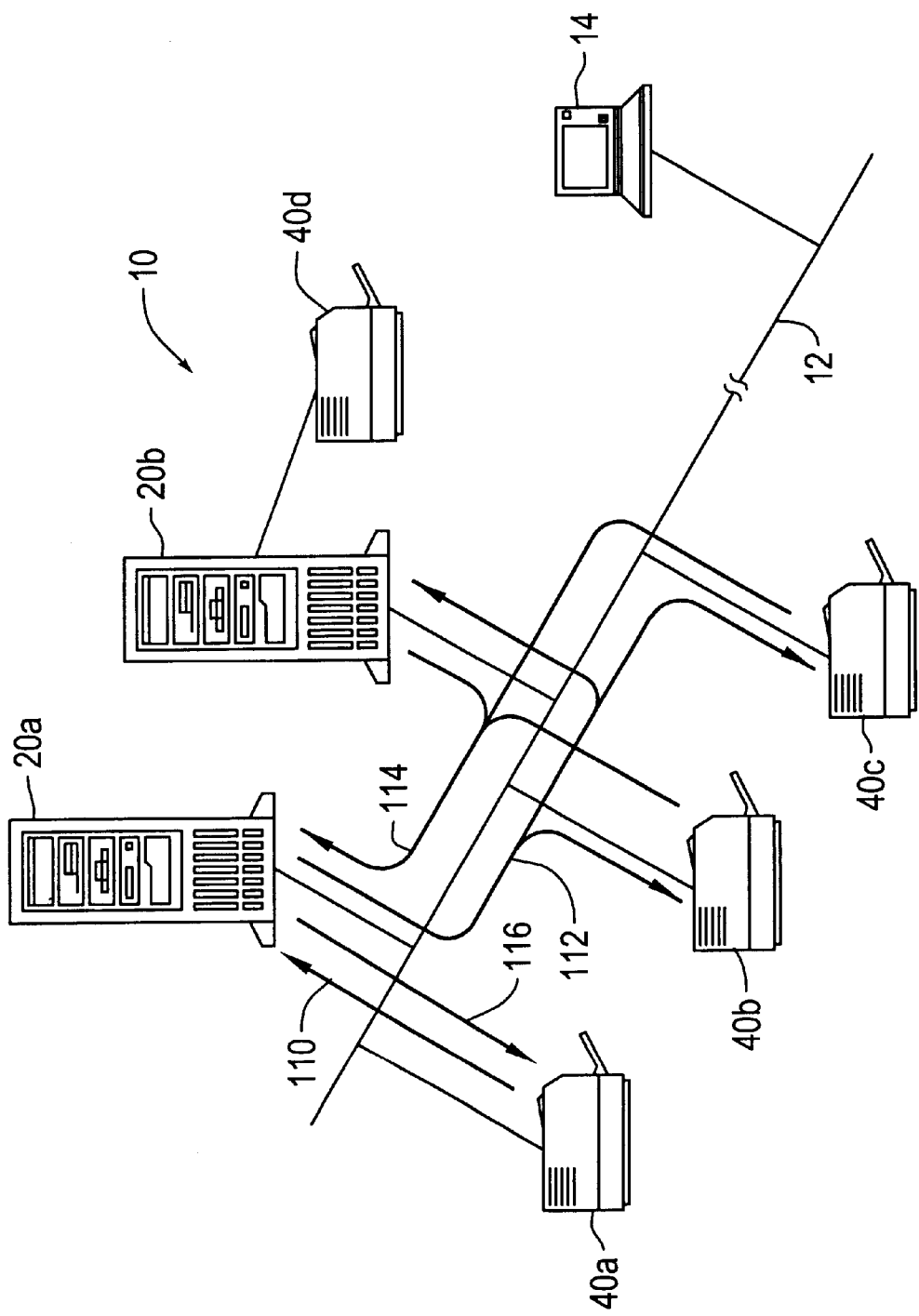
FIG. 1 is a diagram of the network system of the first embodiment.
Figure 2:
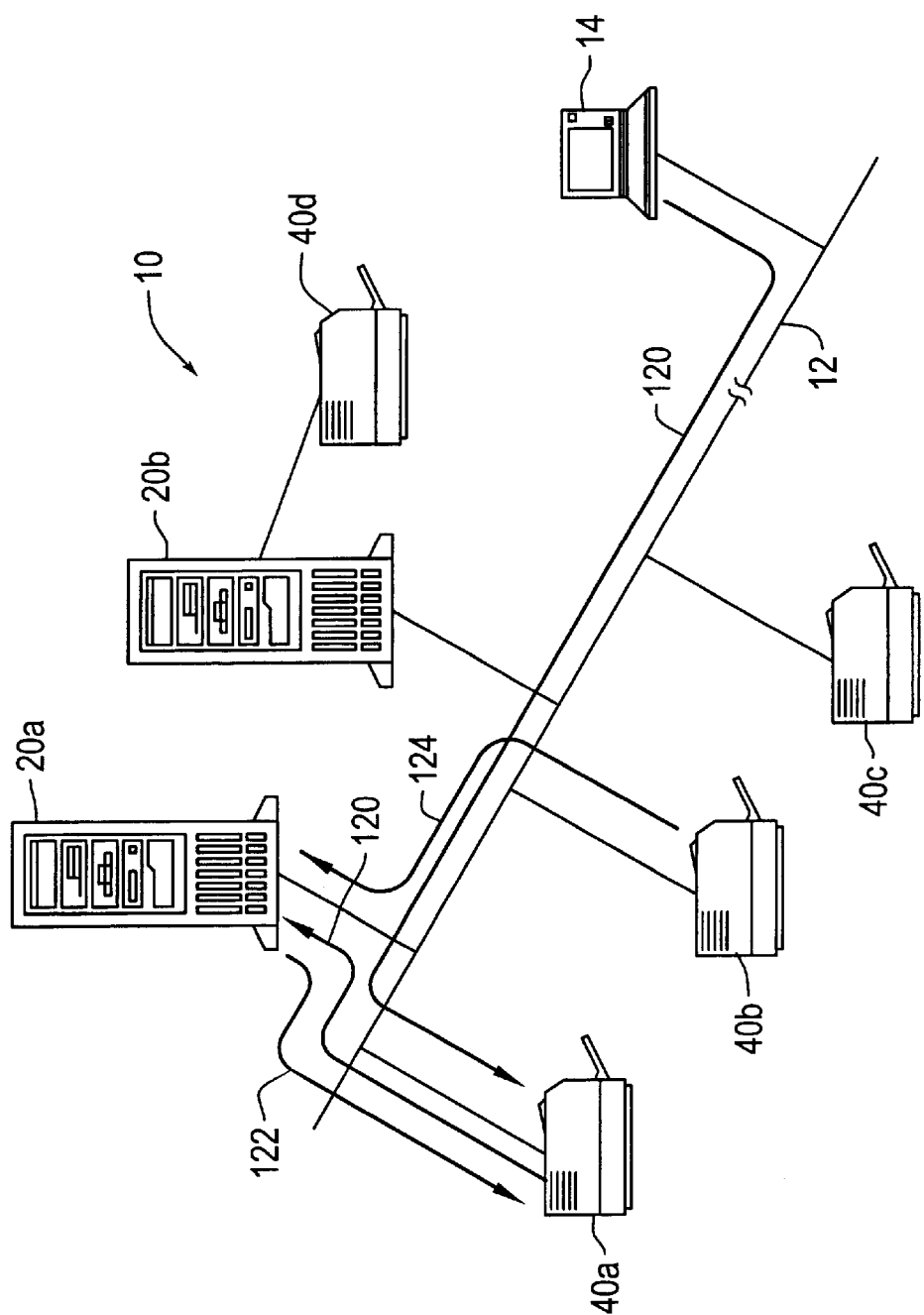
FIG. 2 is a diagram of the network system of the first embodiment.

In FIGS. 1 and 2, the schematic structure of the first embodiment of the printer of the present invention and the network system to which the printer is connected is shown. A plurality of servers 20a and 20b and a plurality of printers 40a, 40b, 40c . . . are connected via a communication line 12 to the network system 10 of the present embodiment. Some printers 40 are directly connected to the server 20b, such as 40d. Moreover, the printers 40 are formed so that they are capable of expansion, depending on the necessity, with respect to the server 20.

Furthermore, in this network system 10, the personal computer (hereafter, PC) 14 is connected via the communication line 12. The PC 14 can access an external network system, for example, the Internet, via the communication line 12, and can receive the data of characters, still images, animated images, sound or the like, as the information. Further, the PC 14 can receive the image data via input/output media, or can create the image data itself.

In the present embodiment, the printer 40a which is connected to the network system, as shown in FIG. 1, performs an inquiry 110 to another device 20a which is connected to the network, regarding the ability information relating to data processing which includes at least one of a process relating to image processing and processing relating to a printing language. The server 20a which receives the inquiry 112 performs an inquiry to other devices 20b, 40b, 40c . . . that are connected by the network, regarding data processing program information which includes information regarding the existence or nonexistence of a data processing program to perform the data processing. The other devices 20b, 40b, 40c . . . that are connected to the network reply to the inquiry of the data processing program information with their own data processing program information 114.

The server 20a determines virtual program information which includes its own executable data processing program based on the data processing program information 114 which is sent from the other devices that are connected to the network. Then, the server 20a replies with respect to the inquiry 110 with the ability information 116 concerning data processing from the printer 40a, based on the virtual program information.

Specifically, for example, even if the server itself does not have a data processing program (P1) in its own memory, when the printer 40b has the data processing program (P1), the server 20a replies with ability information 116 which indicates that it can execute the data processing program (P1).

When the printer 40a receives the ability information 116 based on the virtual program information, and evaluates that the request for data processing is possible, as shown in FIG. 2, the printer 40a transmits the printing data 120 which is received from the PC 14 and its own device information to the server 20a and requests the data processing. Its own device information is, for example, the printer ID or the like, and is used for the evaluation of specifying the printer type in order to perform data processing according to the type of printer at the server device side.

Here, when data processing is performed by using the data processing program (P1), the server 20a receives the data processing program (P1) in a transmission 124 from the printer 40b and performs processing of the printing data 120 using the data processing program (P1). The server 20a transmits the processed printing data 122 to the printer 40a, in response to a transmission request from the printer 40a. The printer 40a receives the converted printing data 122 and performs the print output.

Figure 3:
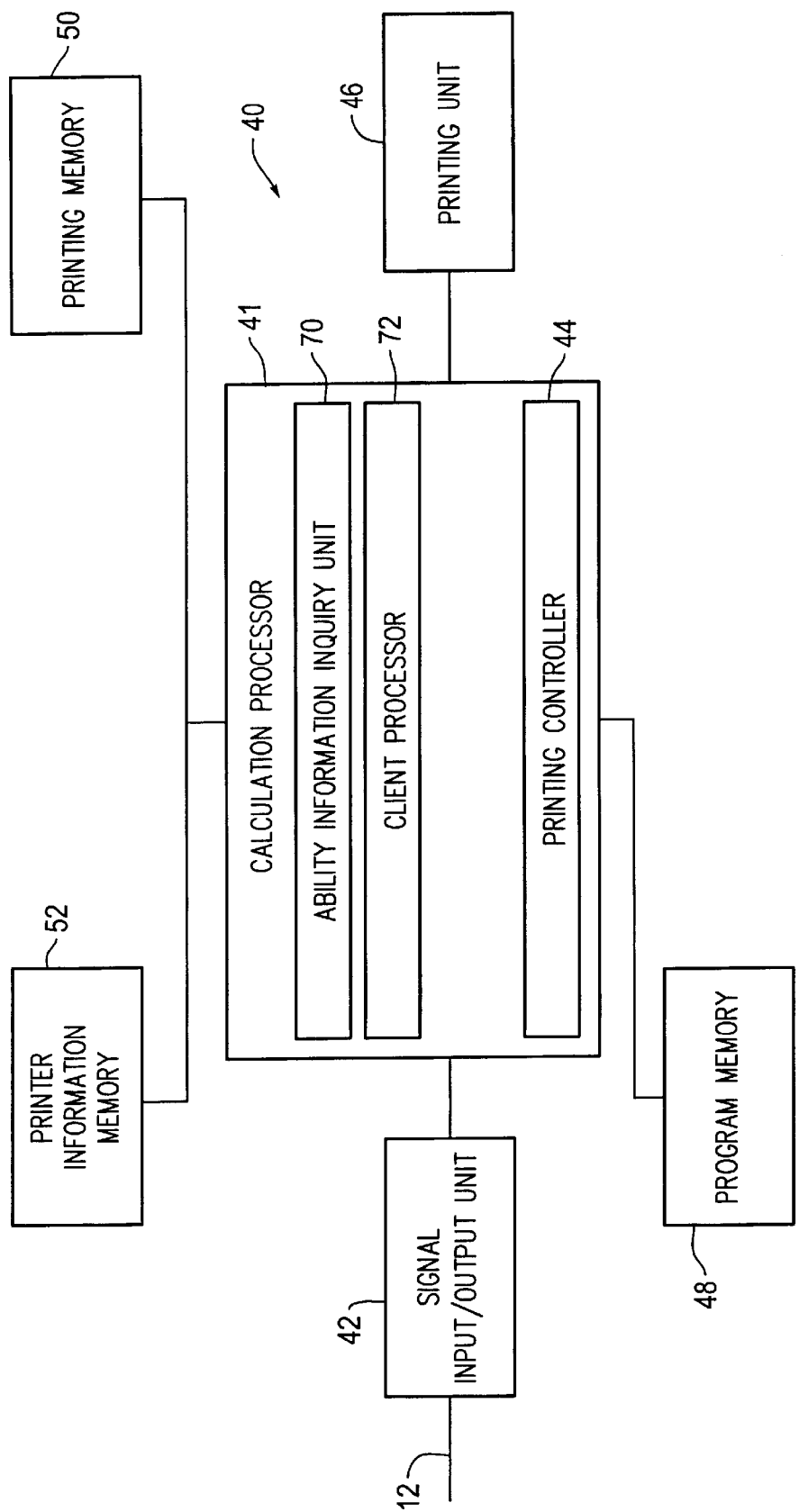
FIG. 3 is a block diagram of the client printer of the first embodiment.

In FIG. 3, a block diagram of a device which functions as a client printer, such as the printer 40a, is shown.

The client printer 40 of the present invention comprises a signal input/output unit 42 connected to the communication line 12, a calculation processor 41 comprising a CPU, or the like, a program memory 48 for storing a printing operation program, for example, an ESC/P processing program or the like, a printing memory 50 for storing the printing data 100 which is transmitted from the PC 14, a printer information memory 52 for storing an ID which specifies the type of the printer (model name) and a printing unit 46 which performs the actual printing based on the printing data.

The calculation processor 41 operates based on the program which is stored in the program memory 48, and functions as the ability information inquiry unit 70 and the client processor 72.

The ability information inquiry unit 70 queries other devices that are connected to the network regarding ability information related to data processing which includes at least one of processing relating to image processing and processing relating to the printer language.

The client processor 72 determines the server device which has requested data processing, based on the ability information which is sent from other devices that are connected to the network in response to the inquiry for ability information. Then, the client processor 72 transmits the printing data to be data processed and its own device information to the server device, requests data processing, and requests the server to transmit the printing data after data processing occurs.

The printing controller 44 writes in the printing data which is transmitted from the server device to the printing memory 50 (which functions as a buffer), and also controls the printing unit 46 so that the data prints out in order.

Figure 4:
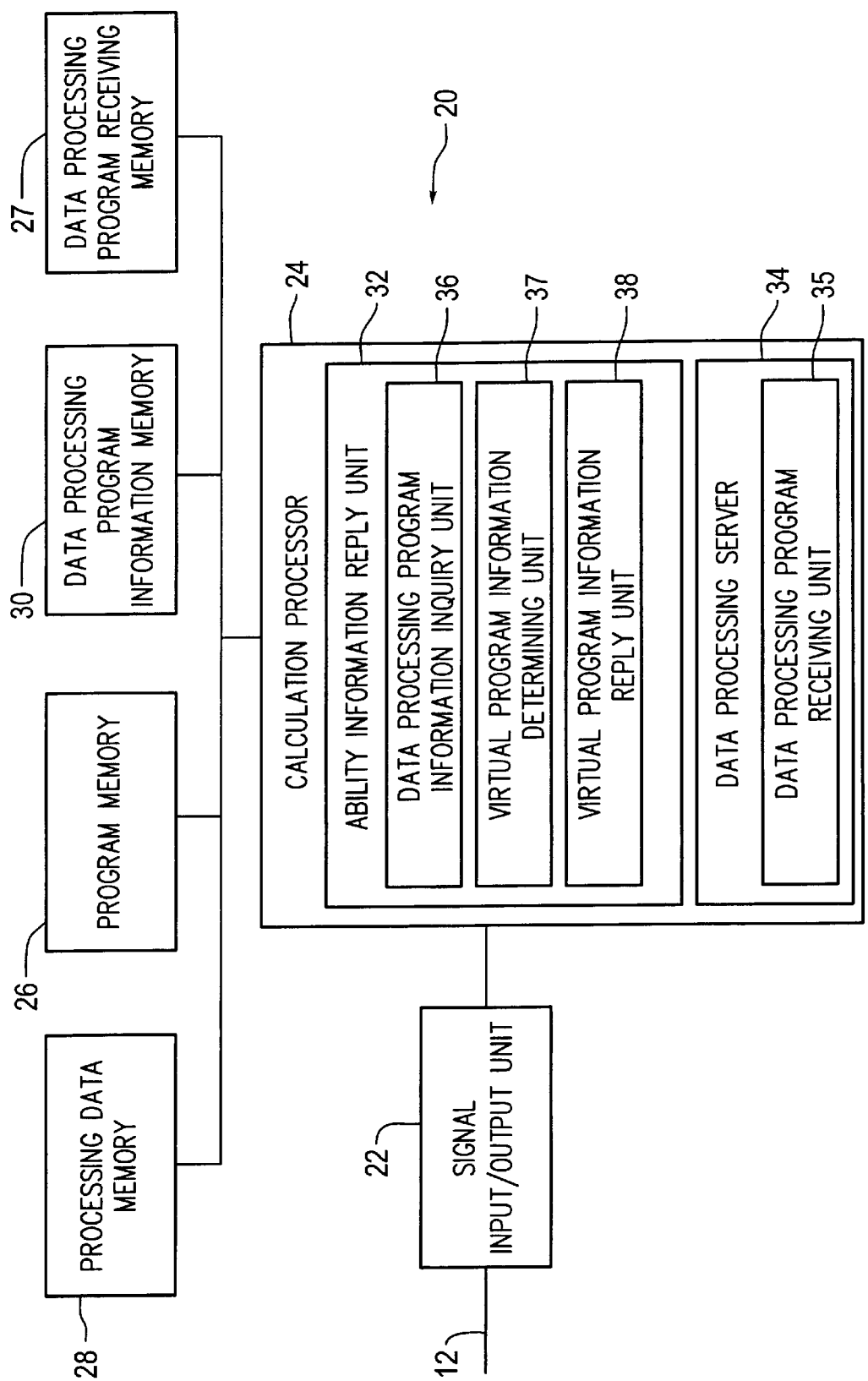
FIG. 4 is a block diagram of the server device of the first embodiment.

FIG. 4 is a block diagram of the server device of the server 20b. The server device of the present embodiment comprises a signal input/output unit 22 which performs transmission and reception of data via the communication line 12, a calculation processor 24 which comprises a CPU, or the like, a program memory 26 in which various operational programs are stored, a processing data memory 28 which stores at least printing data for which a request for data processing has been received from the client printer, and/or processed printing data, a data processing program information memory 30 which stores data processing program information of other devices that are connected to the network, and a data processing program receiving memory 27 for receiving and storing a data processing program from another device on the network. In the program memory 26, the server device's own currently held data processing program is also stored.

In the data processing program information memory 30, the data processing program information which is obtained from other devices is stored. The processing program information includes, for example, the information concerning the existence or non-existence of data processing program version information of the data processing program, and/or the ID which is device information that specifies the type of the printer to which the aforementioned program corresponds. Moreover, the version information of the data processing program which is stored in the program memory 26, and/or the ID which is device information which specifies the type of the printer to which the program corresponds are also stored.

The ID is, for example, the device information of a printer which is suitable to print the created data from an image processing program. However, if the printer uses printer language conversion processing or the like, the ID is, for example, the device information of a printer device which can print with the printing data that includes a generated printer command.

The calculation processor 24 operates based on an operation program, or the like, which is stored in the program memory 26, and functions as the ability information reply unit 32 and the data processing server 34.

The ability information reply unit 32 replies with the ability information relating to its own data processing in response to an inquiry from the client printer about the ability information relating to data processing, and comprises a data processing program information inquiry unit 36, a virtual program information determining unit 37 and a virtual program information reply unit 38.

The data processing program information inquiry unit 36 inquires about the data processing program information, which includes information concerning the existence or nonexistence of a data processing program to perform data processing, with respect to the other devices that are connected to the network.

The virtual program information determining unit 37 determines the virtual program information which includes its own executable data processing program based on the data processing program information which is sent from the other devices that are connected to the network in response to the inquiry.

The virtual program information reply unit 38 replies based on the virtual program information, in response to the inquiry for ability information relating to data processing from the client printer.

The data processing server 34 processes the printing data which is received from the client printer and transmits the processed data to the client printer in response to a transmission request.

The data processing program receiving unit 35, included in the data processing server 34, evaluates another device on the network that has the data processing program necessary to perform the data processing, based on the received device information and the data processing program information which is stored in the data processing program information memory 30. Then, when the printing data is received from the client printer, the data processing program receiving unit 35 requests transmission of and receives, the data processing program which is transmitted from the other device, and stores the program in its own memory.

The data processing program receiving unit 35 evaluates the other device that has the necessary data processing program based on the version information, and requests transmission of the data processing program from the other device.

For example, when there are a plurality of the same type of data processing programs, the data processing program receiving unit 35 transmits the request to the other device that has the newest version of the data processing program. Moreover, if the data processing program receiving unit 35 has the same type of data processing program stored in its own memory 26, the data processing program receiving unit 35 transmits the request to the other device only when the version of the data processing program of the other device is newer.

Figure 5:
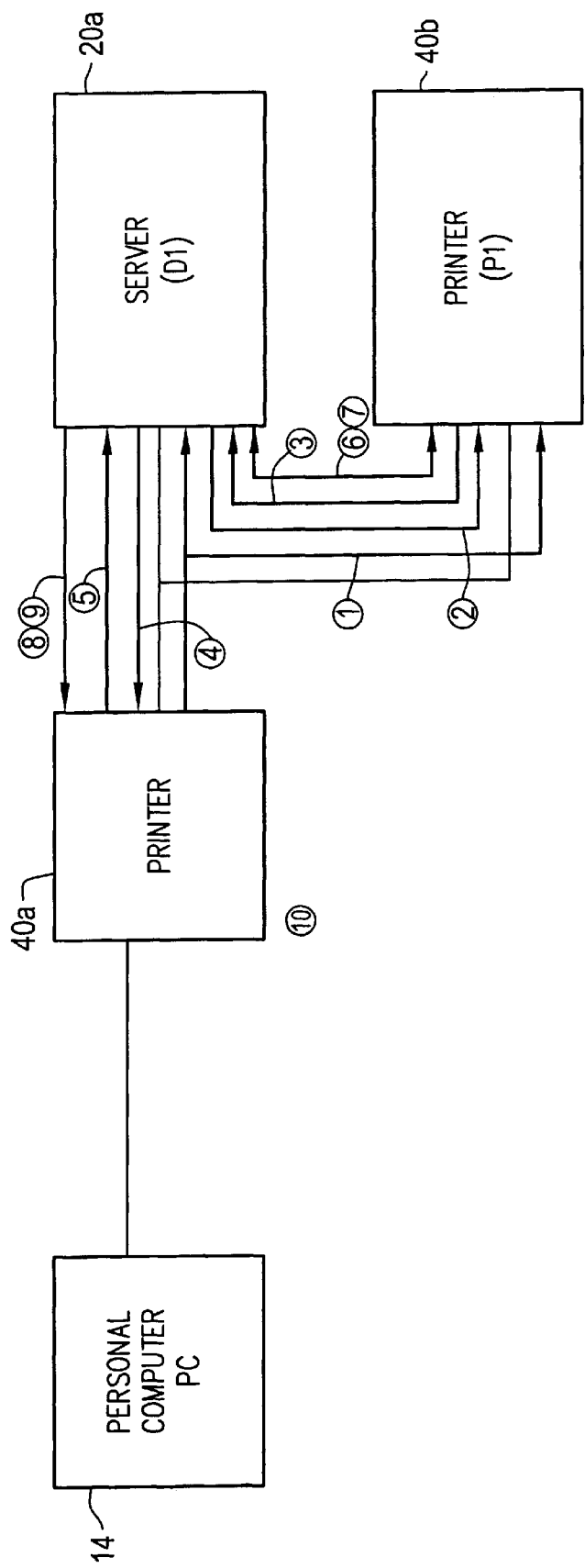
FIG. 5 is a diagram of the detailed operation example of the first embodiment.
Figure 6:
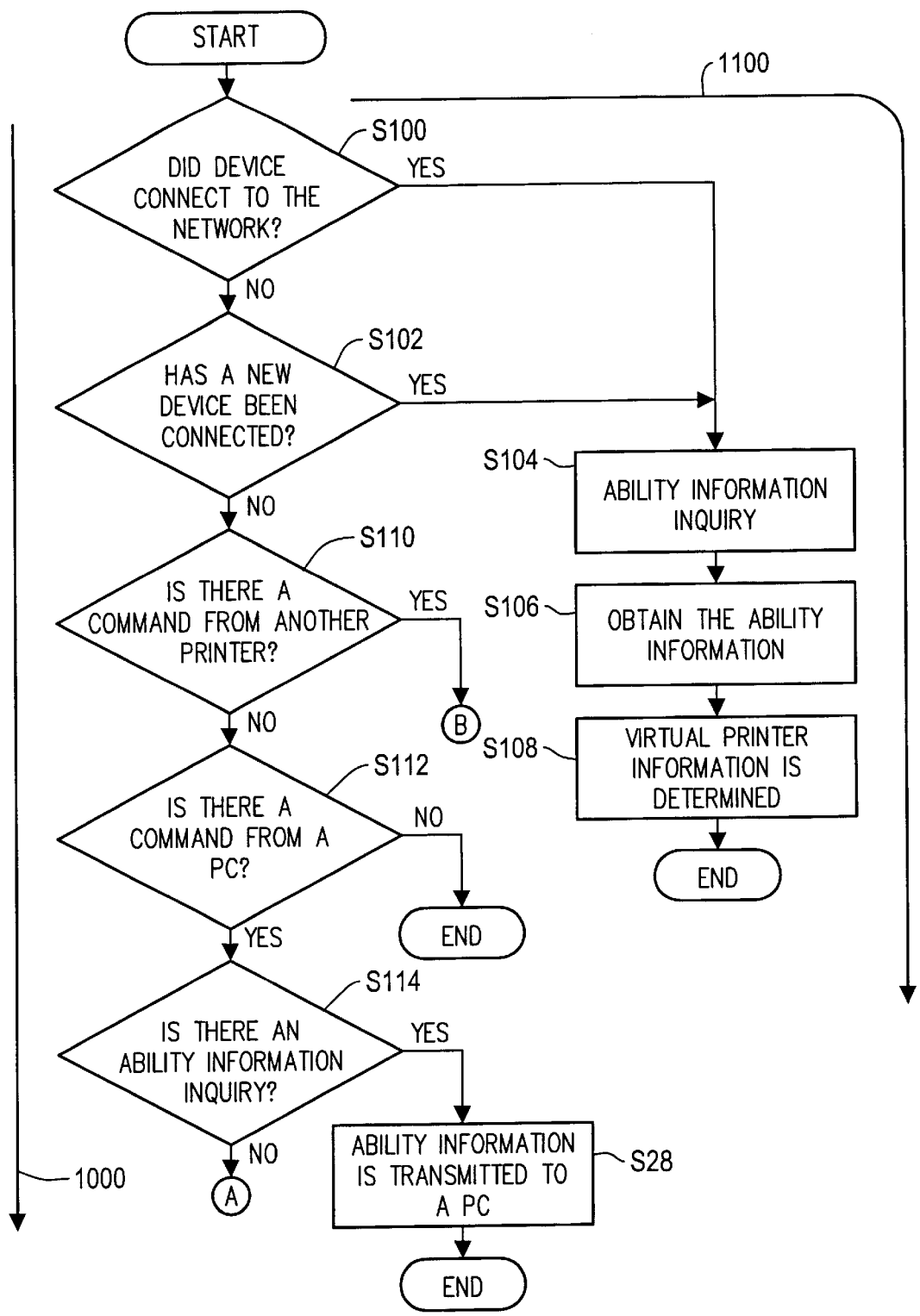
FIG. 6 is a flowchart of the detailed operation of the present invention.
Figure 7:
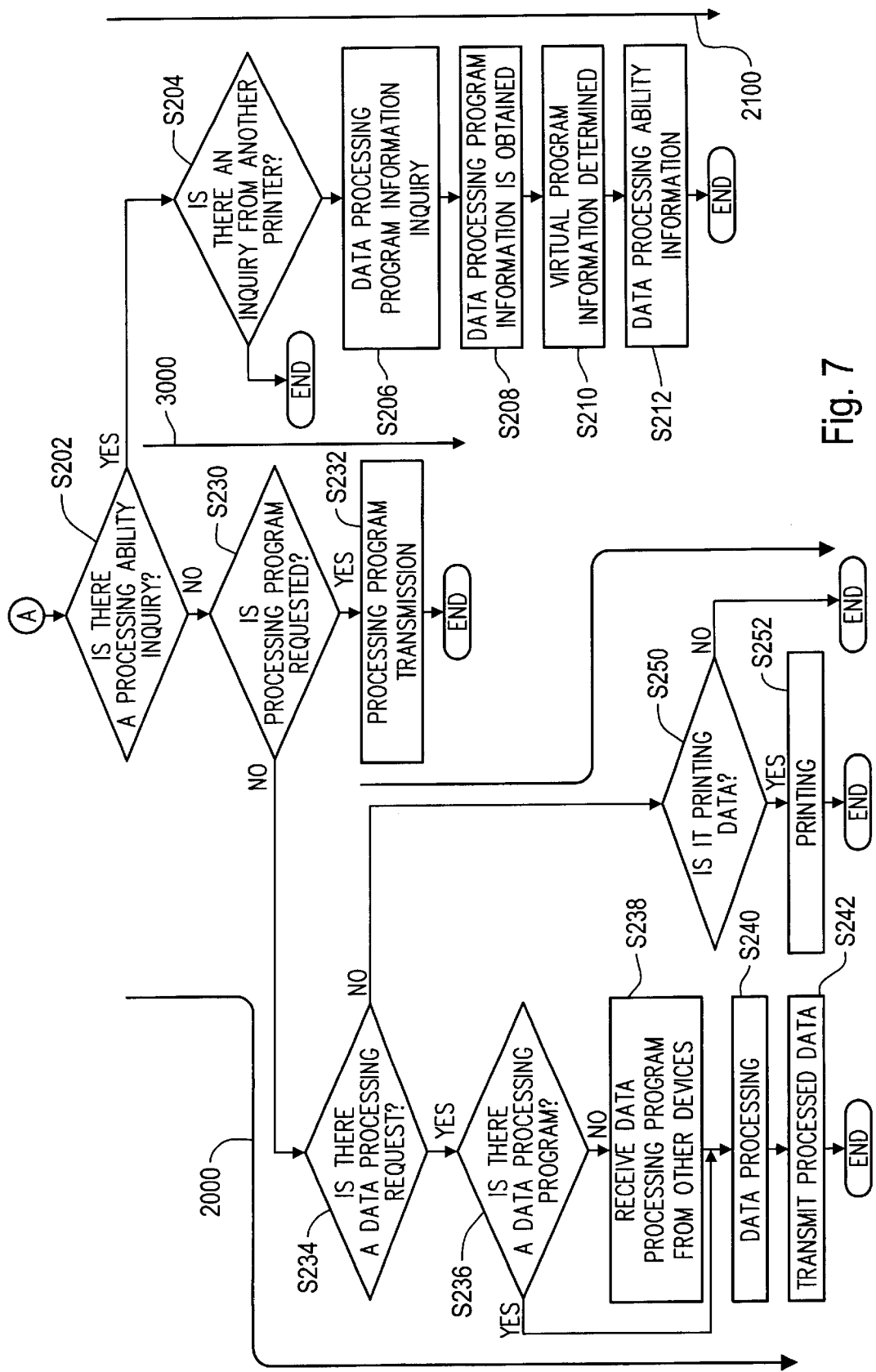
FIG. 7 is a flowchart of the detailed operation of the present invention.
Figure 8:
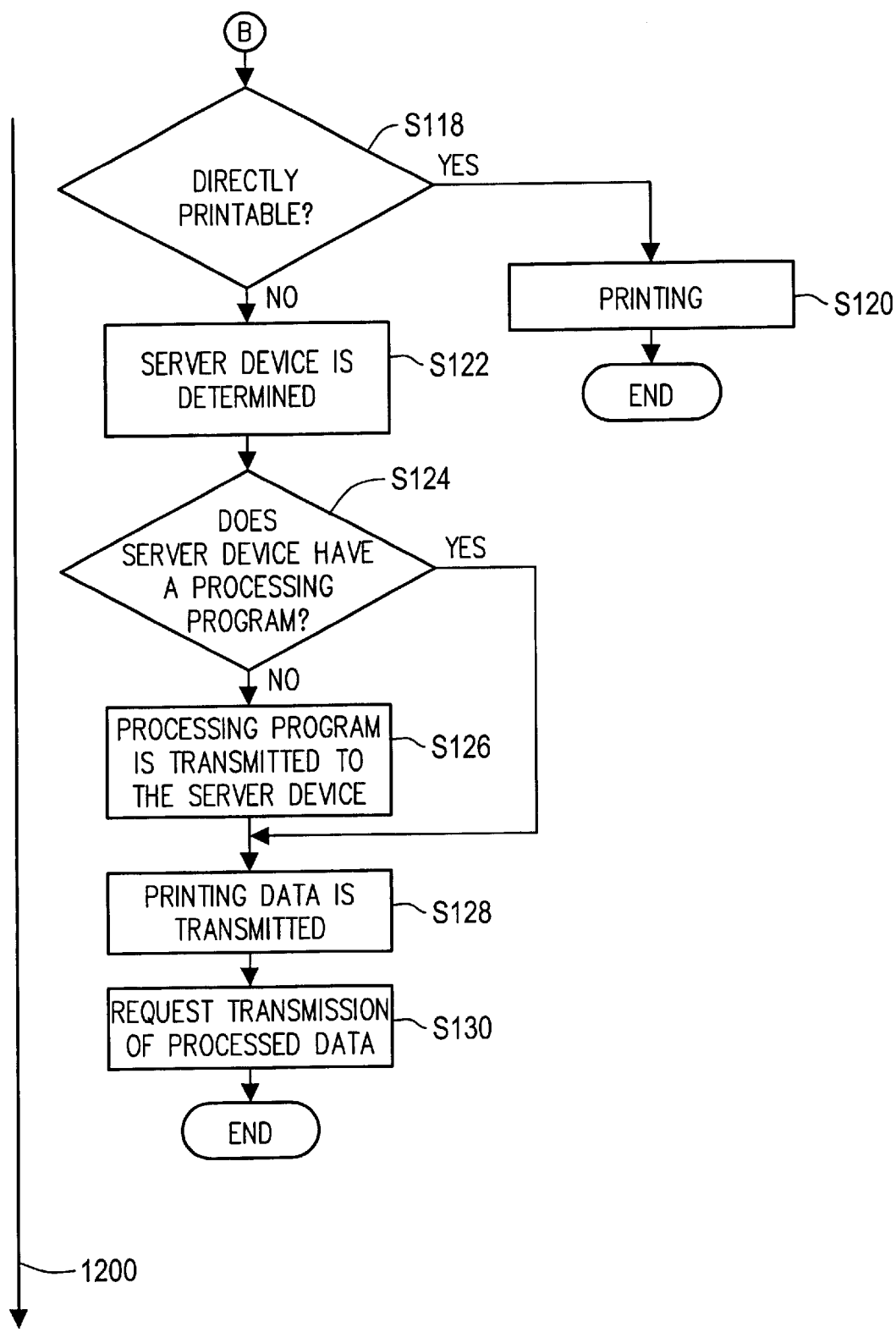
FIG. 8 is a flowchart of the detailed operation of the present invention.

Next, the detailed operation example of the server device and the network system 10 is explained. FIG. 5 shows the detailed operation example of the information processing device (server device) and the network system 10. FIGS. 6, 7 and 8 are flowchart diagrams to explain the operation of the information processing device of the present embodiment. Moreover, the flowchart diagrams of FIGS. 6, 7 and 8 show the operation when the printer functions both as a client printer and as a server device. Therefore, in the flowcharts of FIGS. 6, 7 and 8, the operation in which the printer acts as the client printer (flows 1000 and 1100 of FIG. 6, the flow 1300 of FIG. 7 and flow 1200 of FIG. 8), the operation in which it acts as a server device (the flow 2000 and the flow 2100 of FIG. 7), and the operation in which it acts as the other device which provides the data processing program to the server device (the flow 3000 of FIG. 7), are shown.

An operation example is explained below in which the server device determines the virtual program information and discloses it to the PC 14. In FIG. 5, the server 20a serves as the server device and has a CPU which has a high processing ability and a large memory capacity, and also has an environment which can execute data processing relating to the image processing and the printer language. However, it does not have a processing program for data processing.

(1) First of all, the ability information inquiry unit 70 of the printer 40a performs an inquiry for ability information relating to the data processing with respect to another device on the network (step S104 of FIG. 6).

(b 2) The data processing program information inquiry unit 36 of the server 20b which receives the inquiry from the printer 40a, inquires about the data processing program information with respect to other devices on the network (S202–S206 of FIG. 7).

(3) Other devices on the network that receive the inquiry reply with their own data processing programming information to the server 20a. The server 20a obtains the data processing program information from the other devices on the network, and stores it in the data processing program information memory 30 in relation to each device (S208 of FIG. 7).

For example, when the printer 40b has an image processing program (P1) to perform image processing of printing data which suits the printer 40a, data processing program information (D1) indicating that the "printer 40b has an image processing program (P1) to perform image processing which suits the printer 40a" is stored in the data processing program information memory 30.

(4) The virtual program information determining unit 37 of the server 20a determines virtual program information based on the data processing program information, then, replies with ability information relating to data processing to the printer 40a (S210 and S212 of FIG. 7).

(5) When the printer 40a which receives the printing data that includes the printer command from PC 14, determines that a request to the server 20a for data processing is necessary based on the ability information from the server 20a, it transmits the printing data and its own printer ID, and requests data processing (S122 and S128 of FIG. 8).

(6) (7) The data processing program receiving unit 35 of the server 20a which has received the request for data processing from the printer 40a, determines the necessary data processing program (P1) and the device which has P1 (here, the printer 40b), based on the device of information of the printer and the data processing program information (D1). Since the data processing program receiving unit 35 does not have P1, it requests the printer 40b to transmit P1, receives P1 from the printer 40b, and stores P1 in its own memory (S236 and S238 of FIG. 7). The process in which the printer 40b transmits P1 is shown in S230 and S232 of the flow 3000 of FIG. 7.

Moreover, for example, when the data processing program receiving unit 35 has the necessary data processing program (P1), it is acceptable to compare version information with the data processing program (P1) which another device has and to request transmission of the data processing program only when the version information of another device is newer.

Moreover, when there are a plurality of devices that have the necessary data processing program (P1), it is preferable to check the version information and use the newest version.

(8) (9) The data processing server 34 of the server 20b performs data processing of the printing data which is received from the printer 40a by using P1, and transmits the data processed printing data to the printer 40a in response to the transmission request of the printer 40a (S240 and S242 of FIG. 7).

(10) The printer 40a which receives the data processed printing data from the server 20a performs the printing output (S252 of the flow 1300 of FIG. 7).

According to the present embodiment, the server 20a that has the data processing execution environment discloses the virtual program information to the printer 40a. The virtual program information shows what kind of data processing can be performed by using the data processing programs which the other devices on the network have. Then, even when it does not have the data processing program itself, the server 20a performs the processing by obtaining the data processing program from another device, if needed. In other words, the effective usage of each resource of the network can be obtained regardless of the jurisdictional medium of each source of the data processing program, or the execution environment.

(2) Second Embodiment

The characteristic of the present embodiment is a function relating to improving the functionality of a printer by its connection to a network. This function can be realized when a printer (hereafter, the client printer) which receives a printing instruction from a personal computer (hereafter, PC) requests conversion processing of printing data which is adapted to the printer from another device (hereafter, server device) on the network, receives the converted data, and performs printing.

Figure 9:
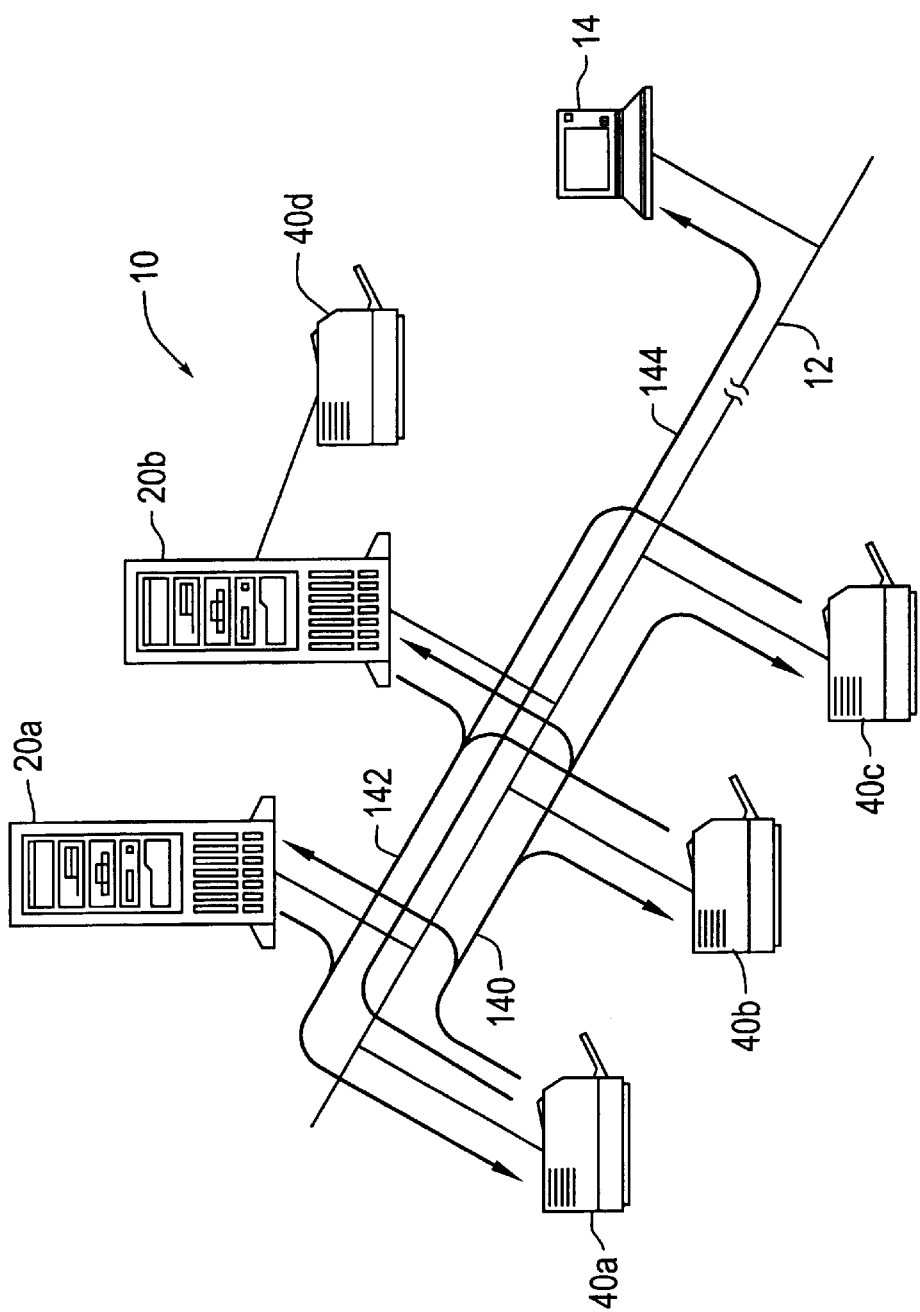
FIG. 9 is a diagram of the network system of the second embodiment.
Figure 10:
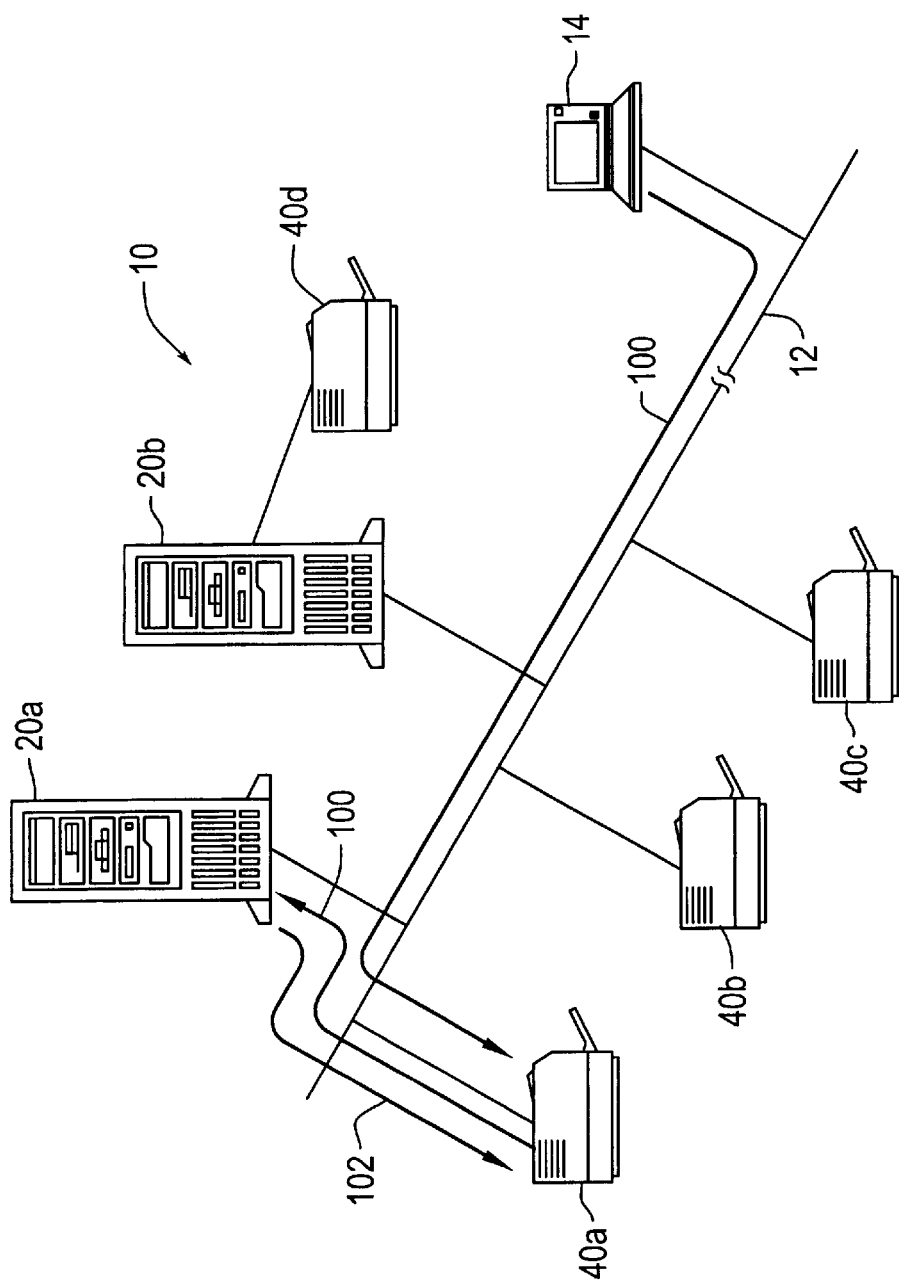
FIG. 10 is a diagram of the network system of the second embodiment.

In FIGS. 9 and 10, the schematic structure of the second embodiment of a network system to which the information processing device of the present invention is connected, is shown.

In the present embodiment, the printer 40a which is connected to the network system, as shown in FIG. 9, performs an inquiry 140 concerning the ability information relating to a printer, which includes at least processing relating to the printer language and/or image processing, with respect to other devices 20a, 20b, 40b, 40c . . . that are connected to the network. The other devices 20a, 20b, 40b, 40c . . . that are connected to the network, reply to the printer 40a with ability information 142 which relates to the printer in response to the inquiry.

The printer 40a evaluates whether there is another device that can improve its functionality based on the ability information 142 which is sent from the other devices and determines its own virtual printer information. Then, the printer 40a discloses the virtual printer information 144 in response to the request from the PC 14.

When the PC 14 receives the virtual printer information and determines that printing is possible, as shown in FIG. 10, the printing data 100 which includes the printer command which is generated by the PC's own printer driver is transmitted to the printer 40a. Upon receiving this printing data 100, the printer 40a determines a server which will perform the processing to convert the received printing data 100 to printing data 102 which is suited to its own printer from among a plurality of printers 40 and the server 20. For example, when the server 20a is determined to be the server device, the printer 40a transmits the printing data 100 to the server 20a and requests conversion processing. The server 20a performs a conversion process upon receiving the printing data 100. Then, server 20a transmits the converted printing data 102 to the printer 40a in response to a transmission request from the printer 40*a*. The printer 40*a* receives the converted printing data 102 and performs the printing output.

Figure 11:
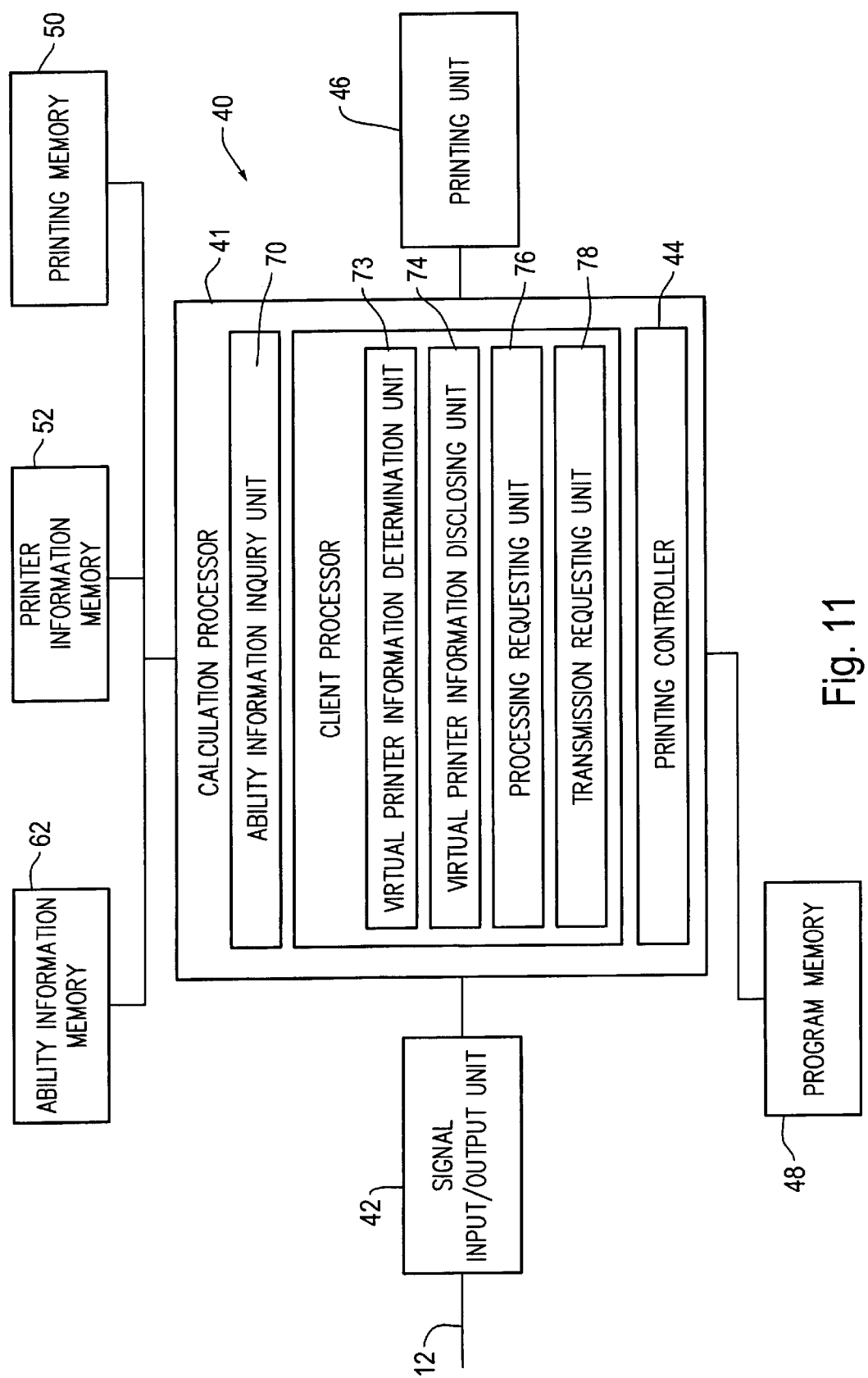
FIG. 11 is a block diagram of the client printer of the second embodiment.

In FIG. 11, a block diagram of the device which functions as a client printer, such as the printer 40*a*, is shown. In FIG. 11, the elements that have same type of functions as the server device of FIG. 3 have the same numbers.

The client printer of the present embodiment comprises a signal input/output unit 42 which is connected to the communication line 12, a calculation processor 41 which comprises a CPU or the like, a program memory 48, a printing memory 50, a printer information memory 52, an ability information memory 62 and a printing unit 46.

The ability information memory 62 stores the ability of other devices on the network, including at least the memory capacity, processing relating to the printer language, image processing, and/or image processing execution environment.

The calculation processor 41 operates based on a program which is stored in the program memory 48, and functions as the ability information inquiry unit 70, the client processor 72 and the printing controller 44.

The ability information inquiry unit 70 queries other devices connected to the network regarding ability information which includes at least memory capacity, processing relating to the printer language, image processing and/or image processing execution environment. Then, the ability information from the other devices is stored in the ability information memory 62. This inquiry is performed when the device itself is first connected or reconnected to the network, or when a new device is connected to the network.

In the present embodiment, the ability information inquiry unit 70 queries other printers on the network regarding ability information relating to printer related functions which includes at least processing relating to the printer language and/or image processing. The ability information memory 62 then stores this ability information relating to these printer related function.

The client processor 72 includes a printing controller 44, a virtual printer information determining unit 73, a virtual printer information disclosing unit 74, a processing requesting unit 76 and a transmission requesting unit 78.

The virtual printer information determining unit 73 evaluates whether there is another device that improves the functionality of the client processor 72 based on the ability information sent from the other devices connected to the network in response to the ability information inquiry, and determines its own virtual printer information.

The virtual printer information disclosing unit 74 discloses the virtual printer information 144 in response to a request from the PC 14. When the processing requesting unit 76 receives a printing data printing request from the PC 14 that exceeds its own processing ability, it determines which server device to transmit the received printing data based on the ability information stored in the ability information memory 62. Then, the processing requesting unit 76 transmits the printing data and its own device information to the server device in real time, and requests performance of a given process. In the present embodiment, the given process is a data conversion process in order to convert printing data which is received from the PC 14, into suitable printing data. Therefore, the processing requesting unit 76 determines the server device for converting printing data to a suitable form, based on the ability information relating to the printer related functions and on the printing data which is received from the PC 14. The transmission requesting unit 78 requests the server device to transmit the processed printing data.

Figure 12:
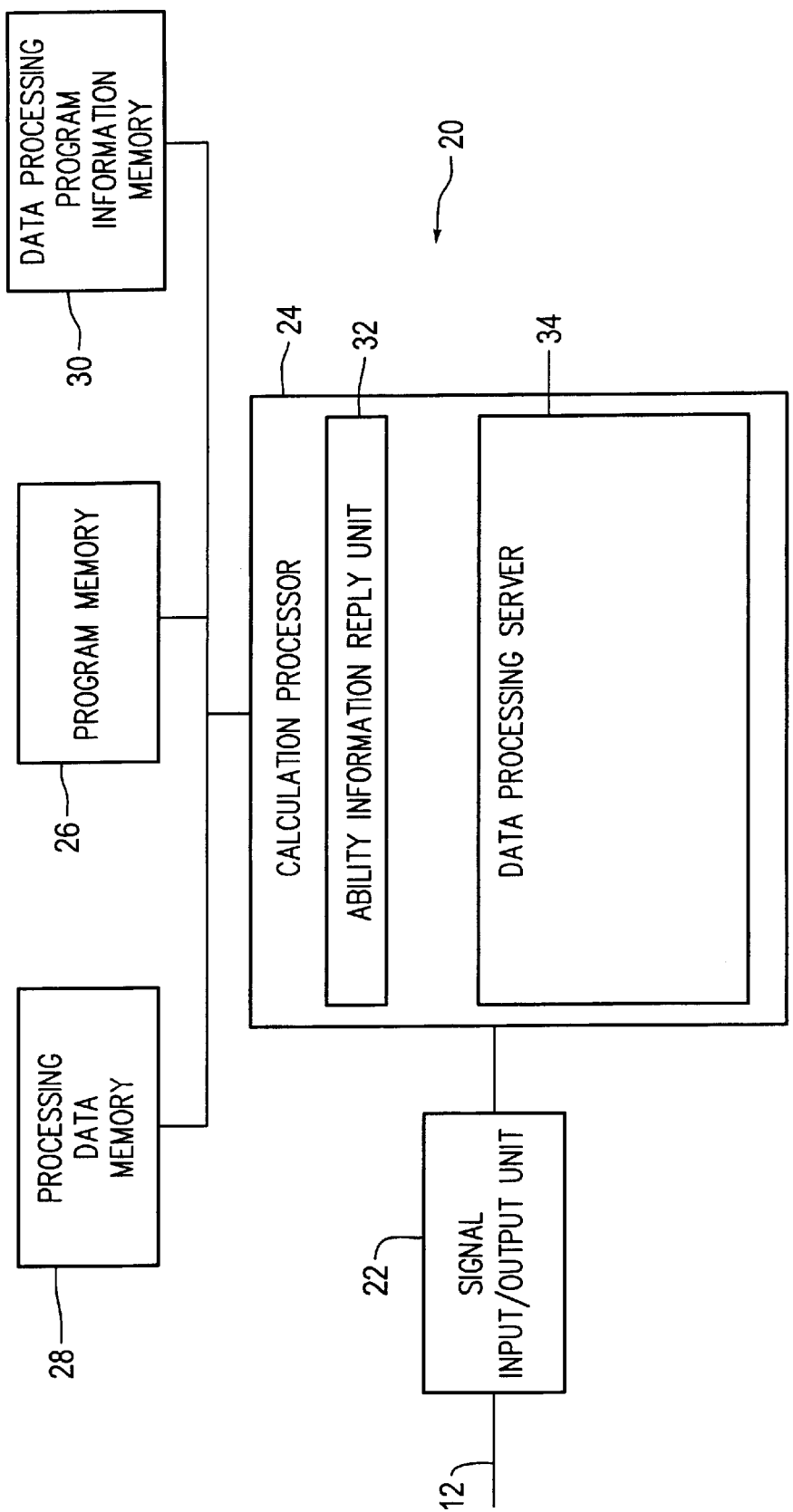
FIG. 12 is a block diagram of the server of the second embodiment.

In FIG. 12, a block diagram of a device which functions as the server device, such as the server 20*a*, is shown. In FIG. 12, elements that have the same type of functions as in the server device of FIG. 4 have the same numbers.

The server device of the present embodiment comprises a signal input/output unit 22 which performs the transmission and reception of data via the communication line 12, a calculation processor 24 which comprises a CPU or the like, a program memory 26 in which various kinds of conversion programs are stored, a processing data memory 28, and a data processing program information memory 30.

In the present embodiment, at least printing data for which a conversion request has been received from the client printer and/or already-processed printing data is stored in the processing data memory 28.

In the program memory 26, a program is stored that carries out data conversion processing, such as processing relating to the printer language and/or image processing, with respect to the printing data for which data conversion processing is requested.

The calculation processor 24 operates based on an operating program, or the like, which is stored in the program memory 26, and functions as the ability information reply unit 32 and the data processing server 34.

In the present embodiment, the ability information reply unit 32 replies with ability information of the printer related functions, which includes at least processing relating to the printer language and/or image processing, to the client printer. The ability information of the printer related functions is, for example, information concerning the existence or non-existence of a program which performs image processing or processing relating to the printer language, or version information, or the like.

In the present embodiment, the data processing server 34, determines a program which will be used for conversion processing of the printing data which is received from the client printer, with reference to the data processing program information memory 30, based on the device information of the printer and the printing data. Then, the conversion process is performed on the printing data by using the aforementioned program which is stored in the data processing server's 34 own program memory 26.

Figure 13:
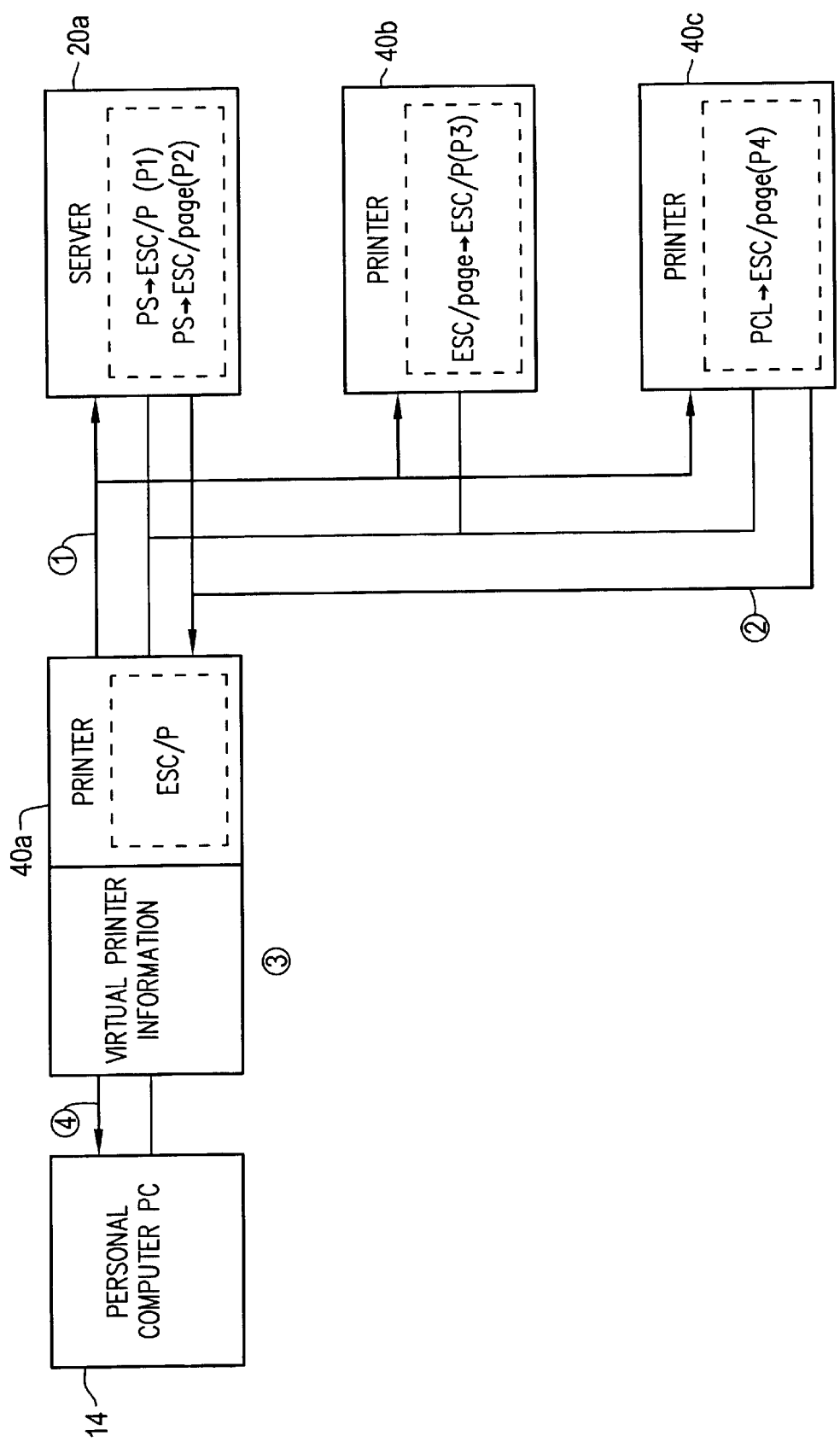
FIG. 13 is a diagram of a detailed operation example of the second embodiment.

Next, detailed operation examples of the printer and the network system 10 of the present embodiment are explained. FIG. 13 is a diagram showing detailed operation examples of the information processing device and the network system of the present embodiment. In particular, an operation example is shown in which the client printer determines the virtual printer information, and discloses it to the PC 14.

In FIG. 13, the printer 40*a* which becomes the client printer is, for example, an ESC/Printer which has a normal ability. In this case, the printer 40*a* only functions as a ESC/Printer before connecting to the network. Accordingly, the PC 14 needs to transmit printing data which includes a printer command which the ESC/Printer can process when it is desired to print using the printer 40*a*.

However, it is possible to disclose virtual printer information in which the functionality of the printer is improved in the PC 14 by connecting to the network 10. The operation of the printer 40*a* when performing the determination and disclosure of this virtual printer information is shown in flows 1000 and 1100 of FIG. 6.

(1) In this process, the ability information inquiry unit 70 of the printer 40*a* performs an inquiry of the printer related ability information with respect to other devices on the network (step S104 of FIG. 6).

(2) The printer 40*a* obtains the ability information from other devices on the network in response to the inquiry (step S 106 of FIG. 6). For example, in FIG. 5, ability information is obtained indicating that the server 20*a* has a processing program (P1) which converts the printing data corresponding to PS to printing data corresponding to ESC/P and a processing program (P2) which converts printing data corresponding to PS to printing data corresponding to ESC/page. Ability information is also obtained indicating that the printer 40*b* has a processing program (P3) which converts the printing data which corresponds to ESC/page to printing data which corresponds to ESC/P. Ability information is further obtained indicating that the printer 40*c* has a processing program (P4) which converts printing data which corresponds to PLC to printing data which corresponds to ESC/page.

(3) The virtual printer information determining unit 73 of the printer 40*a* evaluates whether other devices can support the function of improving the functionality of the printer 40*a* based on the ability information of the printer related function, and determines its own virtual printer information (step S108 of FIG. 6). In FIG. 13, since printer 40*a* is an ESC/printer, if there is a processing program which converts a given printer command, printer language, or the like, to printing data corresponding to ESC/P, virtual printer information is determined indicating that it is a printer which can process the given printer command, printer language, or the like. Accordingly, the printer 40*a* can determine virtual printer information which indicates that it can operate as a PS printer and as an ESC/page printer, through the processing program (P1) and processing program (P3).

(4) Then, if there is inquiry for printer related function ability information from the PC 14, the virtual printer information is disclosed to the PC 14 (steps S112–S116 of FIG. 6).

Figure 14:
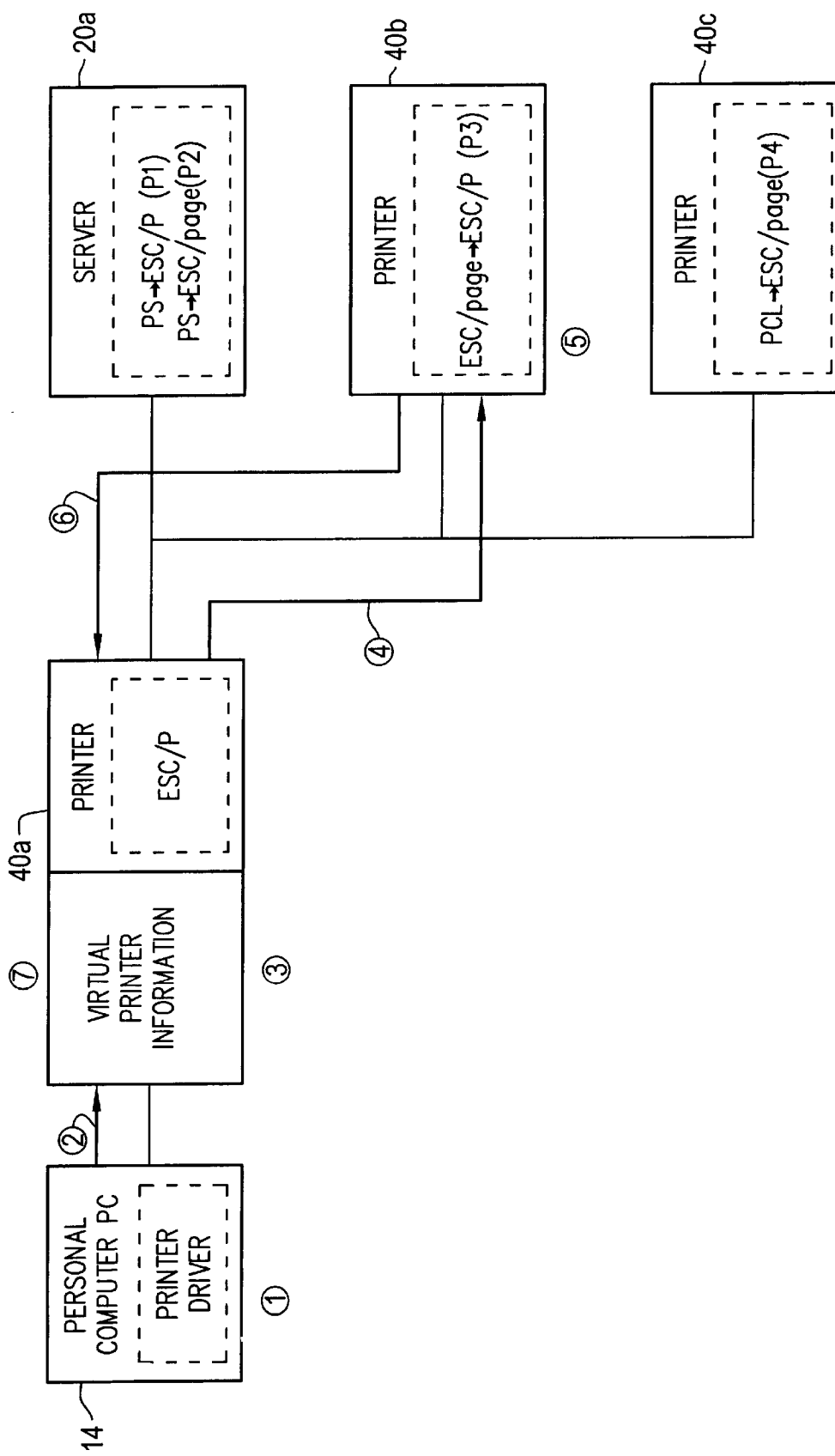
FIG. 14 is a diagram of a detailed operation example of second embodiment.

In FIG. 14, an operation example is shown in which conversion of printing data which is received from the client printer PC 14 is requested from the server device and the converted printing data is printed out. The operation of the printer 40*a* when performing the conversion request is shown in flow 1200 of FIG. 8, the operation of the server device which receives the conversion request is shown in flow 2000 of FIG. 7 and the operation in which the printer 40*a* prints out the data after the conversion is shown in flow 1300 of FIG. 7.

(1) The PC 14 determines the printer command when sending the printing data to the printer 40*a* based on the virtual printer information of the printer 40*a* and the function of its own printer driver.

(2) Then, the data for printing which includes the printer command is generated at the printer driver, and transmitted to the printer 40*a*. For example, it is assumed that printing data is transmitted which is printable by an ESC/page printer.

(b 3) The printer 40*a* which receives the printing data evaluates whether it can directly print the received printer command by itself. Here, the printer 40*a* can only print when it receives printing data which corresponds to ESC/P.

(4) However, since printing data which is printable by an ESC/Page printer is received, it cannot be directly printed. Accordingly, the conversion processing requesting unit 76 determines which server device to request the conversion of the printing data which corresponds to ESC/Page into printing data which is printable by an ESC/P printer based on the ability information, transmits the received printing data and its own device information to the server device, and requests conversion processing. Here, the printing data which corresponds to ESC/Page is transferred to the printer 40*b*, which has a processing program (P3) which converts the printing data which corresponds to ESC/Page into printing data which corresponds to ESC/P, and requests conversion processing (steps S118, S122 and S128 of FIG. 8).

(5) The conversion processing requesting unit 76 of the printer 40*b*, which is the server device to which the conversion processing is requested, determines to perform the conversion processing by using the processing program (P3) based on the printing data which is sent from the printer 40*a* and the device information of the printer 40*a*, and performs the conversion process to convert the received printing data into printing data which is directly printable by the printer 40*a*. Here, it converts printing data which corresponds to ESC/page into printing data which corresponds to ESC/P (steps S236 and S240 of FIG. 7).

(6) Then, the conversion processing requesting unit 76 transmits the conversion processed printing data (step S242 of FIG. 7) to the printer 40*a* in response to the transmission request of the printer 40*a* (step S130 of FIG. 8).

(7) The printer 40*a* receives and prints the conversion processed printing data (steps S250 and S252 of FIG. 7).

According to the present embodiment, the printer 40*a* discloses to the PC 14 virtual printer information which shows that the printer 40*a* can operate on the network. This virtual printer information includes the ability of other devices that are connected to the network in addition to its own ability. Therefore, improved functions can be obtained by connecting the printer to the network.

Moreover, the client printer can realize a function which is more than its own signal ability by requesting processing from another server device that is connected to the network, and a printer in which the functions are largely improved can be realized without increasing the cost of the printer itself.

Moreover, the PC 14 can request printing processing from the upgraded printer. Therefore, printing limitations for the computer are decreased.

(3) Third Embodiment

The characteristic of the present embodiment is that a printer (hereafter, client printer) which requests data processing, transmits the received printing data and its own image processing program to another device (hereafter, the server device) on the network that has an image processing execution environment, and requests image processing. In other words, this is an example of having the content of the data processing be image processing.

The difference between the present embodiment and the case in which image processing is requested from a server device in the first embodiment is that the client printer transmits the image processing program with the printing data.

Figure 15:
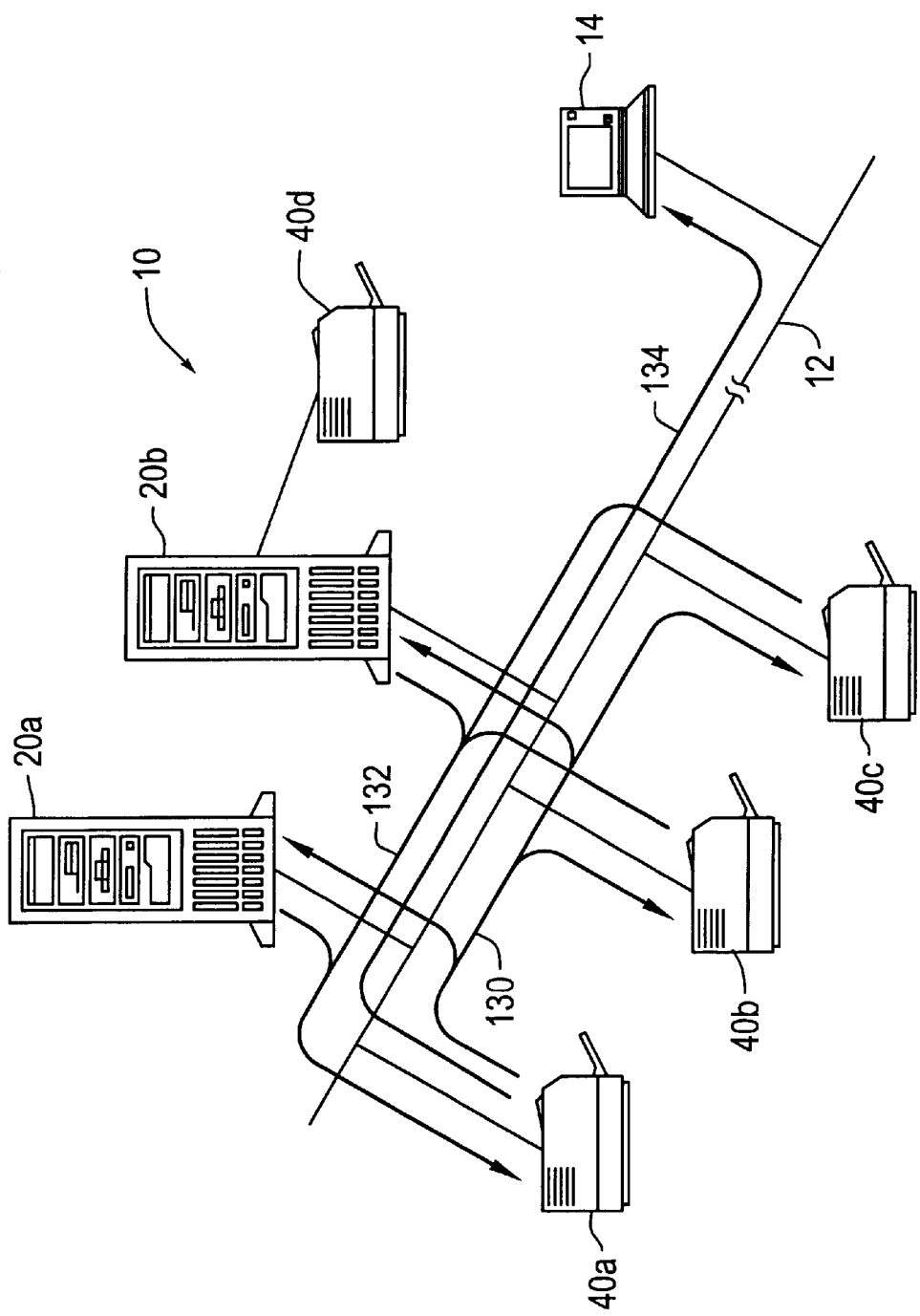
FIG. 15 is a diagram of the network system of the third embodiment.
Figure 16:
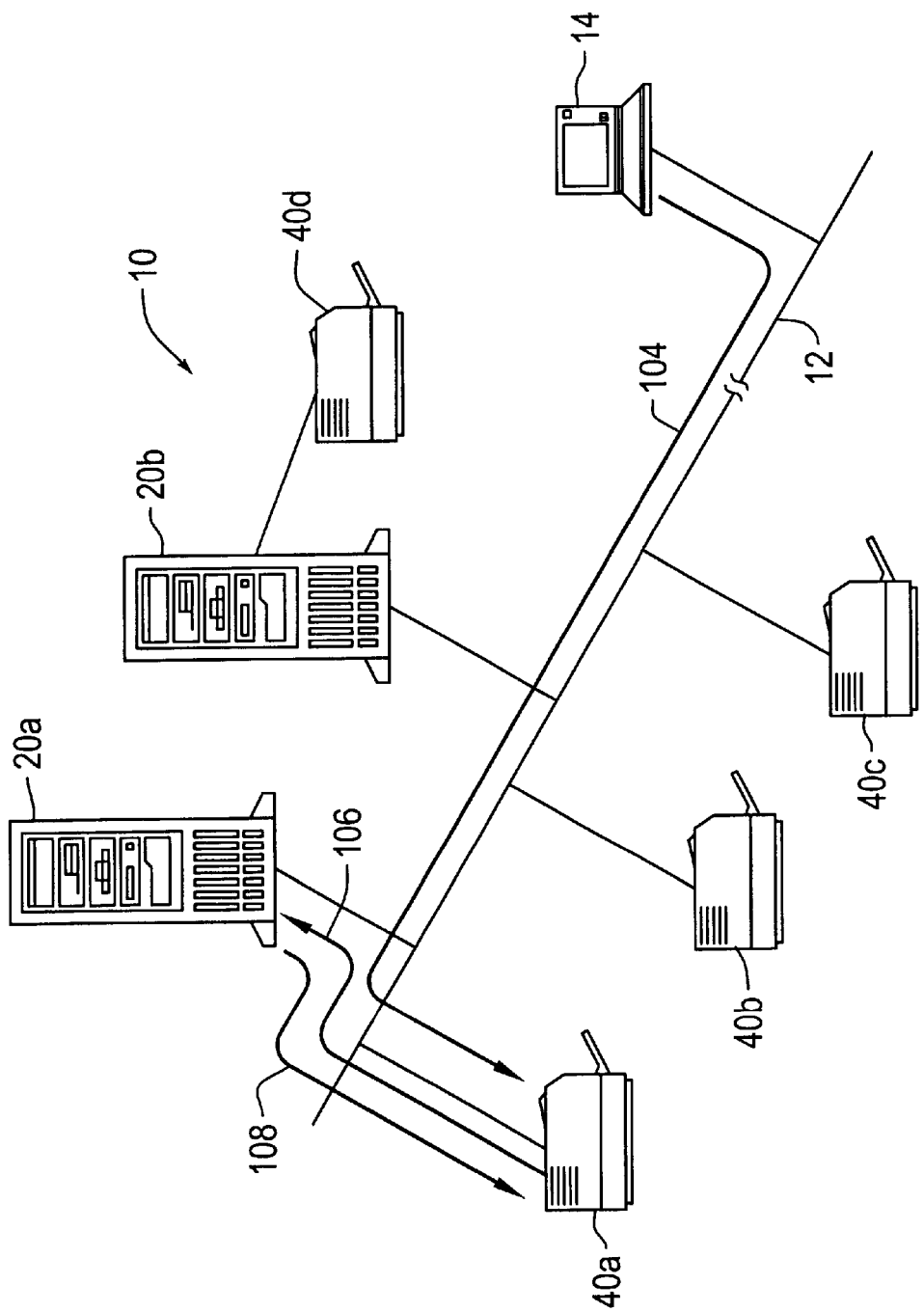
FIG. 16 is a diagram of the network system of the third embodiment.

FIGS. 15 and 16 show the structure of the third embodiment of the information processing device of the present invention and the network system to which the information processing device is connected. The printer 40*a* (or client printer), as shown in FIG. 15, performs an inquiry 130 for the ability information relating to the image processing execution environment with respect to other devices 20*a*, 20*b*, 40*b*, 40*c* . . . that are connected to the network. The other devices 20*a*, 20*b*, 40*b*, 40*c* . . . that are connected to the network reply with ability information 132 which relates to their own image processing execution environment to the printer 40*a* in response to the inquiry.

The printer 40*a* determines a server device which has an environment which can execute image processing for the printing data which is sent from the PC 14 based on the ability information which is sent from the other devices that are connected to the network in response to the inquiry for the ability information relating to the image processing execution environment. The server device is the server 20*a*. Then, virtual printer information 134 indicating that image processing can be performed which suits the printer of the PC 14, is disclosed to the PC 14.

When the PC 14 receives the virtual printer information 134 and evaluates that image processing is possible at the printer 40*a* side, it transmits printing data 104, which includes the image data prior to image processing, to the printer 40*a*, as shown in FIG. 16. The printer 40*a* receives the printing data 104, transfers both the printing data 104 and the image processing program 106 to the server 20*a*, and requests image processing.

The server 20*a* performs image processing of the printing data by using the image processing program when the printing data and image processing program 106 are received, and transmits the processed printing data 108 to the printer 40*a*. The printer 40*a* performs the print output based on the received printing data 108.

Figure 17:
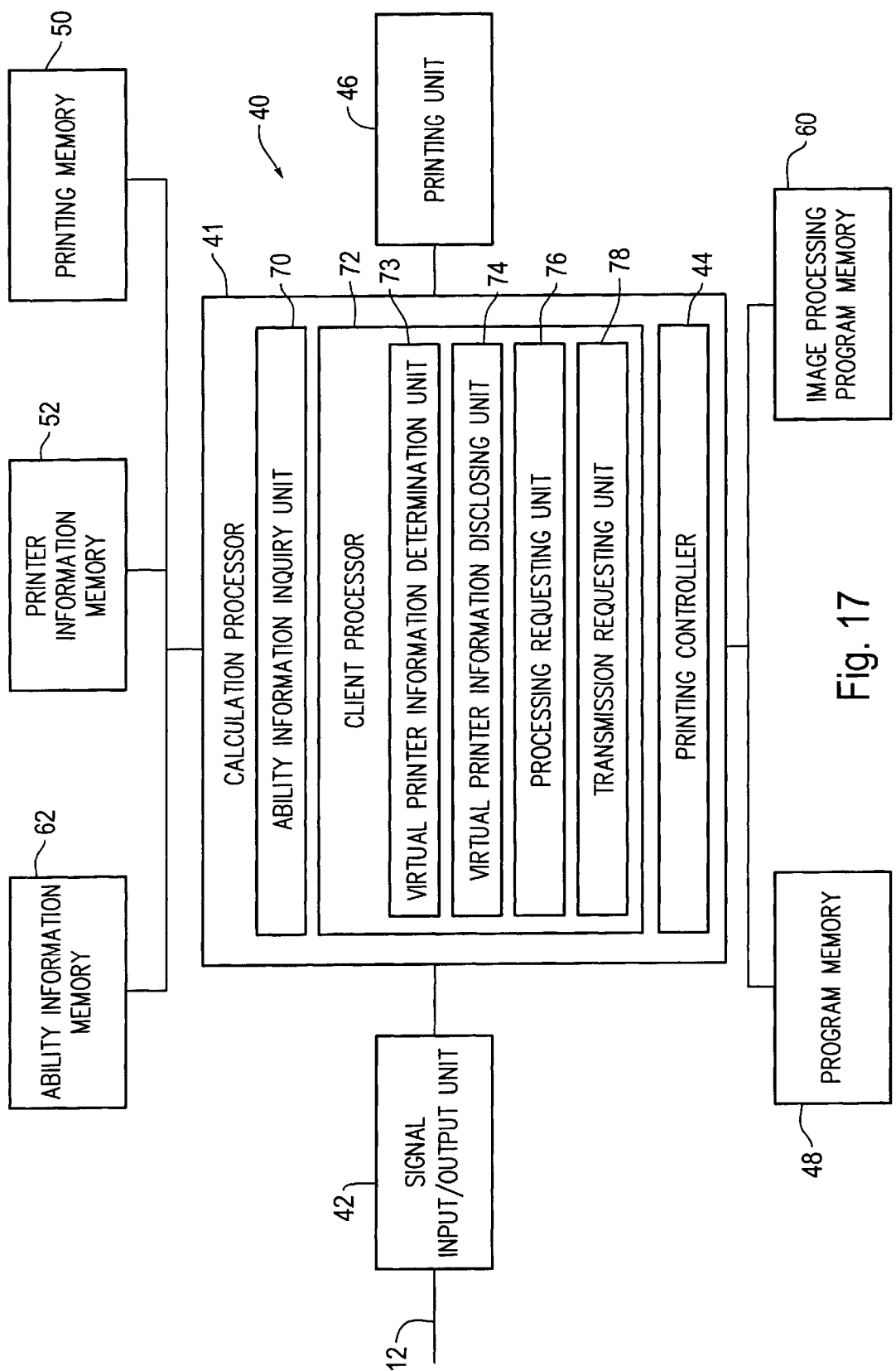
FIG. 17 is a block diagram of the client printer of the third embodiment.

In FIG. 17, a block diagram of the device which functions as a client printer, such as the printer 40*a*, is shown. In FIG. 17, the same numbers are added to elements that have the same type of function as in the function block diagram of the client printers of FIGS. 3 and 11.

The client printer of the present embodiment is composed of a signal input/output unit 42 which is connected to the communication line 12, the calculation processor 41 which comprises a CPU or the like, a program memory 48, a printing memory 50, a printer information memory 52, an ability information memory 62, a printing unit 46 which performs the actual printing based on printing data, and an image processing program memory 60.

Here, the image processing program memory 60 stores an image processing program which performs image processing which suits the device itself. The calculation processor 41 operates based on a program which is stored in the program memory 48, and functions as the ability information inquiry unit 70, the client processor 72 and the printing controller 44.

In the present embodiment, the ability information inquiry unit 70 inquires regarding ability information relating to the image processing execution environment with respect to other devices on the network, and the ability information memory 62 stores this ability information.

The client processor 72 comprises a virtual printer information determining unit 73, a virtual printer information disclosing unit 74, a processing requesting unit 76 and a transmission requesting unit 78.

In the present embodiment, the client printer requests image processing of the printing data which is received from the PC 14. Therefore, the client processor 72 determines the server device which has a sufficient image processing execution environment to perform the image processing, based on the ability information relating to the image processing execution environment. Then, the client printer transfers its own image processing program which is stored in the image processing program memory 60 and the printing data which is received from the PC 14 to the server device in real time, and requests image processing.

Moreover, when the server device has the same type of image processing program as the image processing program which the printer is going to transmit, it is acceptable to have a structure to check the version information and transmit only when, for example, the version information of image processing program of the printer is newer.

Figure 18:
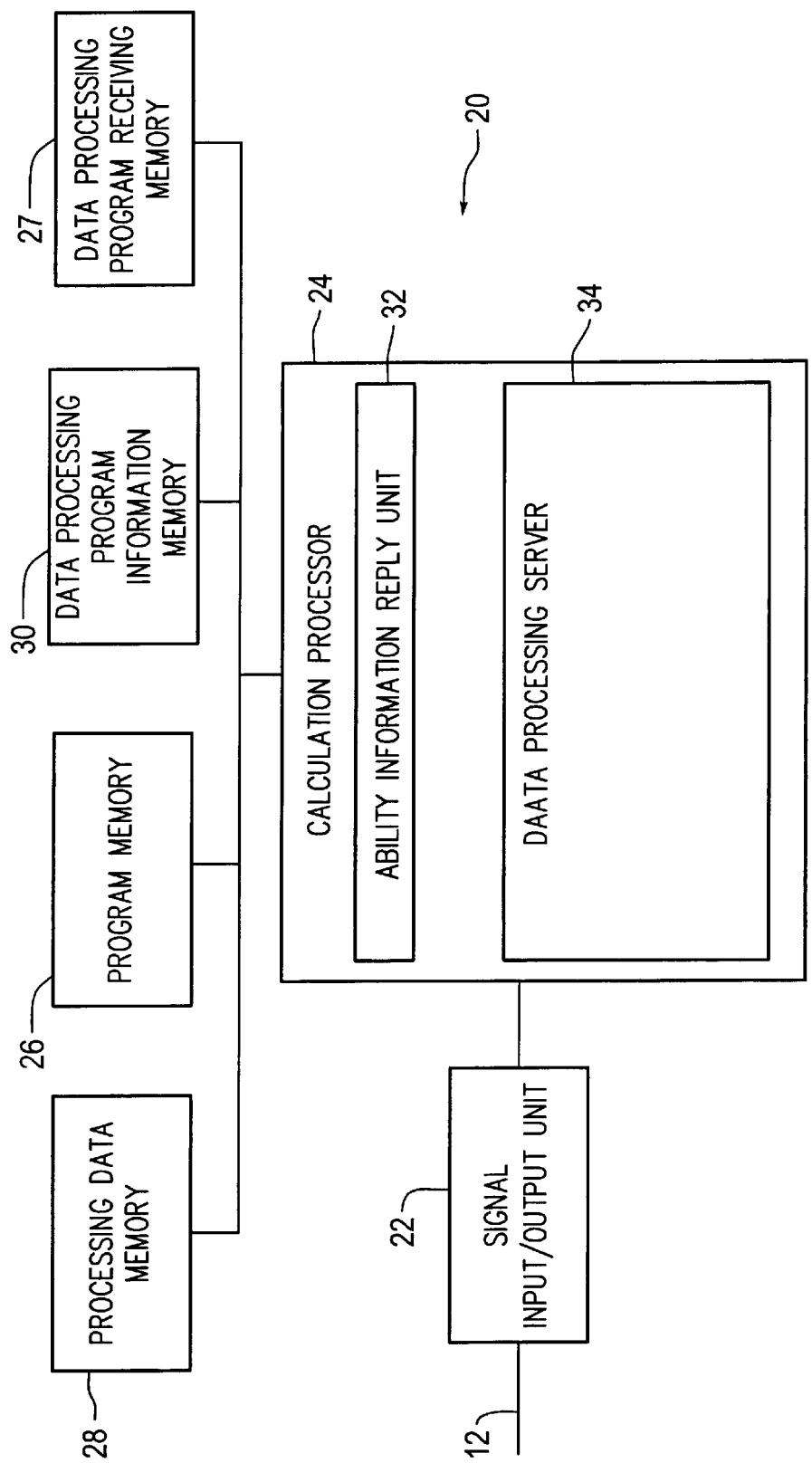
FIG. 18 is a block diagram of the server device of the third embodiment.

In FIG. 18, a block diagram of a device which functions as the server device for image processing, such as the server 20*a*, is shown. In FIG. 18, the same numbers are given to elements that have the same functions as in the function block diagram of the server device of FIGS. 4 and 12.

The server device of the present embodiment is composed of a signal input/output unit 22 which performs transmission and reception of data via the communication line 12, a calculation processor 24 which comprises a CPU or the like, a program memory 26, a processing data memory 28, a data processing program receiving memory 27 and a data processing program information memory 30. The processing data memory 28 stores printing data for which an image processing request has been received, as well as image processed printing data. In the data processing program receiving memory 27, an image processing program which is transmitted from the client printer is stored. The calculation processor 24 comprises an ability information reply unit 32 and a data processing server 34. The ability information reply unit 32 replies with ability information relating to its own image processing execution environment to the client printer in response to an inquiry for ability information relating to the image processing execution embodiment from the client printer.

The data processing server 34 performs image processing of the data for printing using the image processing program which is received from the client printer, and transmits the image processed printing data to the client printer in response to a transmission request from the client printer.

Figure 19:
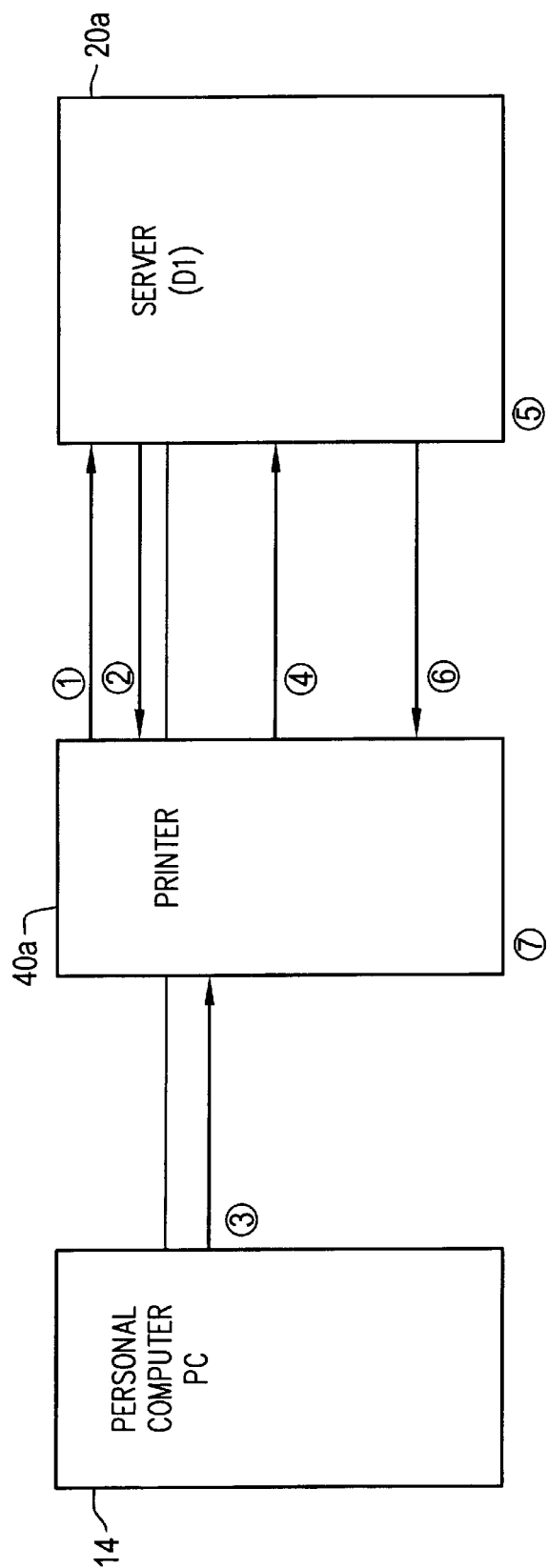
FIG. 19 is a diagram of a detailed operation example of the third embodiment.

FIG. 19 shows a detailed operation example of the information processing device and the network system 10 of the present embodiment. In FIG. 19, an operation example is expanded for the case in which a client printer requests conversion of printing data which is received from the PC 14 and of its own image processing program (P1) from the server 20*a*, and print-outputs the converted printing data.

The operation of the printer 40*a* when requesting image processing is shown in the flow 1000 of FIG. 6, and operation of the server device which receives the image processing request is shown in flow 2000 of FIG. 7.

(1) In this process, the ability information inquiry unit 70 of the printer 40*a* performs an inquiry concerning the ability information relating to the image processing execution embodiment with respect to other devices on the network (step S104 of FIG. 6).

(2) The printer 40*a* obtains the ability information from the other devices on the network in response to the inquiry (step S106 of FIG. 6). For example, in FIG. 5, ability information is obtained indicating that the server 20*a* has a sufficient image processing execution environment, but does not have an image processing program (P1) which performs image processing that suits the printer 40*a*.

(3) Then, printing data, which includes the printer command, is created at the printer driver of the PC 14, and the printing data to which image processing that suits the printer 40*a* has not yet been performed, is transmitted to the printer 40*a*.

(3) The printer 40*a* which receives the printing data evaluates whether the received printing data is able to be printed directly (S118 of FIG. 8). Whether it is directly printable is evaluated based on whether there is a printer command according to which it can directly print the data itself, or whether image processing which suits the printer 40a has been performed, or the like. Here, the received printing data cannot be directly printed since image processing which suits the printer 40a has not been performed.

(4) The printer 40a has an image processing program to perform image processing which suits itself and which is stored on its own. However, when it is determined that the processing time will be increased if image processing is performed by the printer 40a because of the processing ability, or when the printer 40a does not itself have the image processing execution environment, an imaging request is made to a server device which has a sufficient image execution environment. In other words, the server device is determined based on the ability information, resulting in the printing data and image processing program (P1) being transmitted to the server device (S118, S122, S124, S126 and S128 of FIG. 8).

(5) The data processing server 34 of the printer 40b which is the server device to which the image processing is requested performs the image processing of the printing data (S234, S236 and S240 of flow 2000 of FIG. 7), using the image processing program (P1) which is received from the printer 40a.

(6) Then, the data processing server 34 transmits the image processed printing data to the printer 40a in response to a transmission request (step S130 of FIG. 8) from the printer 40a (step S242 of FIG. 7).

(7) The printer 40a which receives and prints the image processed printing data (step S250 and S252 of flow 1300 of FIG. 7).

According to the present embodiment, the PC 14 can request printing processing from a printer in which the ability of the image processing execution environment is improved. Therefore, it is acceptable to not execute an image processing program which has a high processing ability at the PC side. Accordingly, the printing can be started sooner without taking too much time for image processing, even with a printer which has a low processing ability.

Moreover, since the client printer transmits a suitable image processing program to another server device that is connected to the network, and requests execution of the image processing, the memory efficiency compares to when the server device has image processing programs that correspond to all devices.

Moreover, in the present embodiment, an example was given in which the content of the data processing is image processing, but is also acceptable when the processing relates to the printer language. In that case, it is acceptable to have a structure such that the client printer transmits a processing program to convert the printer language which suits the printer, along with the printing data, to the server device and requests processing.

Moreover, it is acceptable to implement each embodiment independently, or in combination.

Moreover, in each embodiment, an example was given in which the client printer and server device are provided in the network system 10. However, when a printer exists which has sufficient ability, it is acceptable to structure the system 10 so that the printer functions as the server device.

Accordingly, when the printer has the function of the client printer as well as the function of the server device, the printer can operate as a client printer and/or as the server device, depending on the necessity. Moreover, the flowcharts shown in FIGS. 6, 7 and 8 show the printer operation when it functions as both the client device and the server device.

The network system of the present invention is not limited to the embodiment examples and it is possible to perform various modified operations within the scope of the present invention.

What is claimed is:

1. A network system, comprising:
    a client printer that performs a data processing request; and
    a server device that executes data processing that includes at least one of an image processing that is requested by the client printer and processing relating to a printer language;
    the client printer comprising:
        a data processing ability information inquiry unit that queries other devices connected to the network concerning ability information relating to the data processing;
        a client processor that determines a server device from which to request data processing based on the ability information received from the other network devices, transmits printing data that is to be data processed to the server device, requests data processing, and requests transmission of the processed data from the server device to the client printer; and
        a printing controller that controls reception and printing of the processed data received from the server device;
    the server device comprising:
        an ability information reply unit that replies with ability information relating to the server device's own data processing ability in response to an ability information inquiry from the client printer; and
        a data processing server that processes printing data that is received from the client printer and transmits the processed data to the client printer in response to a transmission request from the client printer.

2. The network system according to claim 1, the ability information reply unit further comprising:
    a data processing program information inquiry unit that queries other devices connected to the network system concerning data processing program information including information concerning existence or nonexistence of a data processing programs;
    a virtual program information determining unit that determines virtual program information including the server device's own executable data processing program information, based on the data processing program information that is received from the other devices that are connected to network; and
    a virtual program information reply unit that replies with ability information relating to data processing to the client printer based on the virtual program information.

3. The network system of claim 2, the data processing server further comprising:
    a data processing program receiving unit that determines another device on the network that has a data processing program necessary for data processing based on the received data processing program information, requests the other device to transmit the data processing program, receives the data processing program that is transmitted from the other device in response to the transmission request, and stores the data processing program in memory.

4. The network system of claim 3, the data processing program information comprising:

version information of the data processing program, wherein the data processing program receiving unit determines whether another device on the network has the necessary data processing program based on the version information and requests the other device to transmit the necessary data processing program.

5. The network system of claim 4, wherein when a plurality of data processing programs of a same kind exist, the data processing program receiving unit requests transmission from a device having the newest data processing program based on the version information.

6. The network system of claim 1, wherein the server device stores the data processing program in its own memory, and the data processing server processes the printing data by using the stored data processing program.

7. The network system of claim 6, wherein if another device has a same kind of data processing program as is stored in the server device's own memory, the data processing program receiving unit requests transmission of the data processing program from the other device only when the version information of the other device indicates the data processing program is newer.

8. The network system of claim 1, wherein the client processor transmits the client printer's own device information to the server device, and the data processing server determines the data processing program for processing printing data based on the device information that is received from the client printer.

9. The network system of claim 1, wherein the client printer stores the data processing program in its own memory, the client processor transmits the printing data and the data processing program that is stored in the client printer's own memory to the server device and requests processing, and the data processing server processes printing data using the data processing program that is received from the client printer.

10. The network system of claim 9, wherein the data processing program which the client printer transmits to the server device includes at least a data processing program that performs image processing.

11. The network system of claim 9, the ability information relating to data processing comprising:
    version information of the data processing program, wherein when the server device has a same kind of data processing program as the data processing program that is stored in client printer's own memory, the client processor transmits data processing program to the server device only when version information of the data processing program indicates that the server device's data processing program is newer.

12. The network system of claim 2, wherein the data processing program information inquiry unit queries other devices that are connected to the network concerning data processing program information when at least one of the following situations occur: (1) the server device is connected to the network, (2) another device is connected to the network, and (3) there is an ability information inquiry from the client printer.

13. The network system of claim 1, wherein the printing data includes image data, or image data and a printing command.

14. An information processing device connectable by a network, to a plurality of devices, including a printer that requests data processing, and executes data processing that includes at least one of processing relating to image processing that is requested by the printer, and processing relating to a printer language, the information processing device comprising:

an ability information reply unit that replies with ability information relating to the information processing device's own data processing in response to an ability information request from the printer relating to data processing, and a data processing server that processes printing data that is received from the printer, and transmits the processed printing data to the printer in response to a transmission request from the printer.

15. The information processing device of claim 14, the ability information reply unit comprising:
    a data processing program information inquiry unit that queries other devices connected to the network concerning data processing program information, which includes existence or nonexistence information of data processing programs;
    a virtual program information determining unit that determines virtual program information that includes information indicating the information processing device's own executable data processing program, based on the data processing program information that is sent from the other devices that are connected to the network in response to a data processing program inquiry; and
    a virtual program information reply unit that replies to the data processing program inquiry from the printer, based on the virtual program information.

16. The information processing device of claim 14, the data processing server comprising:
    a data processing program receiving unit that determines another device on the network that has a data processing program that is necessary to process data, based on the data processing program information, requests the other device to transmit the data processing program, receives the data processing program that is transmitted from the other device in response to the transmission request, and stores the received data processing program in memory.

17. The information processing device of claim 16, the data processing program information comprising:
    version information of the data processing program, wherein the data processing program receiving unit determines another device that has the data processing program based on the version information and requests the other device to transmit the data processing program.

18. The information processing device of claim 17, wherein when there are a plurality of data processing programs of a same kind, the data processing program receiving unit requests transmission from another device that has the newest data processing program based on the version information.

19. The information processing device of claim 14, wherein the data processing server has the data processing program prestored in the server device's own memory, and processes the printing data by using the prestored data processing program.

20. The information processing device of claim 19, wherein when a same kind of data processing program is stored in the server device's own memory, the data processing program receiving unit requests transmission from another device only when the ability information of the other device indicates that the data processing program is newer.

21. The information processing device of claim 14, wherein the data processing server determines the data processing program for processing printing data based on the device information that is received from the printer.

22. The information processing device of claim 14, wherein the data processing server processes the printing data using the data processing program that is received from the printer.

23. The information processing device of claim 14, wherein the data processing program that is received from the printer includes at least a data processing program for performing image processing.

24. The information processing device of claim 14, further comprising:
- a data processing ability inquiry unit that queries other devices connected to the network concerning ability information relating to data processing;
- a client processor that determines a server device from which to request data processing based on the ability information that is sent from the other devices that are connected to the network in response to an ability information inquiry, transmits the printing data to be data processed to the server device, requests data processing, and requests transmission of the processed data from the server device; and
- a printing controller that controls reception and printing of the processed data received from the server device.

25. The information processing device of claim 24, wherein the ability information relating to data processing comprises:
- version information of the data processing program, wherein when the server device has a same kind of data processing program as the data processing program which is stored in the information processing device's own memory, the client processor transmits the data processing program to the server device only when the version information stored in the information processing device's own memory indicates that the server device's data processing program is newer.

26. The information processing device of claim 15, wherein the data processing program information inquiry unit queries other devices that are connected to the network concerning data processing program information when at least one of the following situations occurs: (1) the information processing device is connected to the network, (2) when another device is connected to the network, and (3) when an ability information inquiry is made from the client printer.

27. The information processing device of claim 14, wherein the printing data comprises image data, or image data and a printing command.

28. An information memory medium connectable by a network to a plurality of devices that include a printer that performs a data processing request, and which stores information to control an information processing device that can execute data processing that includes at least one of image processing and processing relating to a printer language that is requested from the printer, comprising:
- ability information relating to the information processing device's own data processing for response to an ability information inquiry relating to data processing from the printer, and
- information for data processing of printing data that is received from the print, and for transmitting the data processed data to the printer in response to a transmission request from the printer.

* * * * *